United States Patent
Haba et al.

(10) Patent No.: US 9,617,936 B2
(45) Date of Patent: Apr. 11, 2017

(54) EXHAUST PURIFICATION SYSTEM OF INTERNAL COMBUSTION ENGINE

(71) Applicant: TOYOTA JIDOSHA KABUSHIKI KAISHA, Toyota-shi, Aichi (JP)

(72) Inventors: Yuki Haba, Mishima (JP); Kohei Yoshida, Gotenba (JP); Yusuke Nozaki, Gotenba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/910,847

(22) PCT Filed: Jun. 27, 2014

(86) PCT No.: PCT/JP2014/067849
§ 371 (c)(1),
(2) Date: Feb. 8, 2016

(87) PCT Pub. No.: WO2015/025624
PCT Pub. Date: Feb. 26, 2015

(65) Prior Publication Data
US 2016/0195032 A1  Jul. 7, 2016

(30) Foreign Application Priority Data

Aug. 21, 2013 (JP) .................................. 2013-171399

(51) Int. Cl.
*F01N 3/00* (2006.01)
*F02D 41/02* (2006.01)
(Continued)

(52) U.S. Cl.
CPC ....... *F02D 41/0275* (2013.01); *F01N 3/0814* (2013.01); *F01N 3/0842* (2013.01);
(Continued)

(58) Field of Classification Search
CPC .... F01N 3/0814; F01N 3/0871; F01N 3/2066; F01N 3/208; F02D 41/0275; F02D 41/1454
(Continued)

(56) References Cited

U.S. PATENT DOCUMENTS

| | | |
|---|---|---|
| 2001/0052232 A1 | 12/2001 | Hoffmann et al. |
| 2004/0050037 A1 | 3/2004 | Betta et al. |
| 2012/0124971 A1 | 5/2012 | Bisaiji et al. |

FOREIGN PATENT DOCUMENTS

| | | |
|---|---|---|
| EP | 2239432 A1 | 10/2010 |
| EP | 2460990 A1 | 6/2012 |

(Continued)

OTHER PUBLICATIONS

Aug. 28, 2015 Written Opinion issued in International Patent Application No. PCT/JP2014/067849.

*Primary Examiner* — Jason Shanske
(74) *Attorney, Agent, or Firm* — Oliff PLC

(57) ABSTRACT

In an internal combustion engine, a hydrocarbon feed valve and an exhaust purification catalyst are arranged in an engine exhaust passage. A first NOX removal method which injects hydrocarbons from the hydrocarbon feed valve within a predetermined range of period so that the reducing intermediate generated thereby reduces the NOX contained in the exhaust gas and a second NOX removal method which makes the air-fuel ratio of the exhaust gas flowing into the exhaust purification catalyst a first target rich air-fuel ratio by a period which is longer than this predetermined range are used. When the NOX removal method is switched from the second NOX removal method to the first NOX removal method, the air-fuel ratio of the exhaust gas flowing into the exhaust purification catalyst is made a second target air-fuel ratio which is smaller than the first target rich air-fuel ratio.

4 Claims, 17 Drawing Sheets

(51) Int. Cl.
  *F01N 3/08* (2006.01)
  *F01N 3/20* (2006.01)
  *F02D 41/14* (2006.01)

(52) U.S. Cl.
  CPC .......... *F01N 3/0871* (2013.01); *F01N 3/208* (2013.01); *F01N 3/2066* (2013.01); *F02D 41/1454* (2013.01); *F02D 41/1475* (2013.01); *F01N 2370/02* (2013.01); *F01N 2430/06* (2013.01); *F01N 2610/03* (2013.01); *F01N 2900/0412* (2013.01); *F01N 2900/0422* (2013.01); *F01N 2900/1602* (2013.01); *F01N 2900/1614* (2013.01); *F01N 2900/1622* (2013.01); *F02D 2200/0806* (2013.01); *F02D 2200/0808* (2013.01); *Y02T 10/24* (2013.01)

(58) Field of Classification Search
  USPC .......................................................... 60/286
  See application file for complete search history.

(56) References Cited

FOREIGN PATENT DOCUMENTS

| | | |
|---|---|---|
| EP | 2460998 A1 | 6/2012 |
| JP | 4868096 B2 | 2/2012 |
| JP | 2012-057571 A | 3/2012 |

EXHAUST PURIFICATION SYSTEM OF INTERNAL COMBUSTION ENGINE

TECHNICAL FIELD

The present invention relates to an exhaust purification system of an internal combustion engine.

BACKGROUND ART

Known in the art is an internal combustion engine which comprises an exhaust purification catalyst arranged in an engine exhaust passage and a hydrocarbon feed valve arranged in the engine exhaust passage upstream of the exhaust purification catalyst, a precious metal catalyst is carried on an exhaust gas flow surface of the exhaust purification catalyst, a basic layer is formed around the precious metal catalyst, and a first $NO_x$ removal method which reduces $NO_x$ contained in the exhaust gas by a reducing intermediate which is held on the basic layer and generated by injecting hydrocarbons from the hydrocarbon feed valve within a predetermined range of period and a second $NO_x$ removal method in which an air-fuel ratio of the exhaust gas flowing into the exhaust purification catalyst is made rich by a period which is longer than the above-mentioned predetermined range to make $NO_x$ which is stored in the exhaust purification catalyst when the air-fuel ratio of the exhaust gas is lean to be released from the exhaust purification catalyst and be reduced are used (for example, see PTL 1).

CITATION LIST

Patent Literature

PTL 1. Japanese Patent No. 4868096

SUMMARY OF INVENTION

Technical Problem

In this internal combustion engine, when releasing a stored $NO_x$ from the exhaust purification catalyst in case where the second $NO_x$ removal method is being used, the air-fuel ratio of the exhaust gas flowing into the exhaust purification catalyst is made rich by generating a rich air-fuel ratio combustion gas in a combustion chamber. On the other hand, in this internal combustion engine, if the $NO_x$ removal method is switched from the second $NO_x$ removal method to the first $NO_x$ removal method in the state where $NO_x$ is stored in the exhaust purification catalyst, there is the problem that when the first $NO_x$ removal method is used, the $NO_x$ purification rate falls. Further, if the $NO_x$ removal method is switched from the second $NO_x$ removal method to the first $NO_x$ removal method in the state where $NO_x$ is stored in the exhaust purification catalyst, there is the problem that if the temperature of the exhaust purification catalyst rises after the first $NO_x$ removal method is started, $NO_x$ is released from the exhaust purification catalyst without being reduced. Therefore, in this internal combustion engine, when the $NO_x$ removal method is switched from the second $NO_x$ removal method to the first $NO_x$ removal method, to make the $NO_x$ stored in the exhaust purification catalyst be released from the exhaust purification catalyst, at this time as well, the air-fuel ratio of the exhaust gas flowing into the exhaust purification catalyst is made rich.

However, in this internal combustion engine, the degree of richness of the air-fuel ratio of the exhaust gas at this time is made somewhat smaller compared with the degree of richness of the air-fuel ratio of the exhaust gas for release of $NO_x$ when the second $NO_x$ removal method is being used. Therefore, at this time, to make the $NO_x$ be released well, sufficient time becomes required in the same way as when making $NO_x$ be released when the second $NO_x$ removal method is being used. However, when the second $NO_x$ removal method is being used, the engine operating state which enables the combustion chamber to generate rich air-fuel ratio combustion gas is limited. Therefore, when the $NO_x$ removal method is switched from the second $NO_x$ removal method to the first $NO_x$ removal method, sometimes sufficient time cannot be obtained for making the $NO_x$ stored in the exhaust purification catalyst be released. As a result, in this internal combustion engine, there is the problem that when the $NO_x$ removal method is switched from the second $NO_x$ removal method to the first $NO_x$ removal method, sometimes it is no longer possible to sufficiently release the stored $NO_x$ from the exhaust purification catalyst.

Solution to Problem

To solve this problem, according to the present invention, there is provided an exhaust purification system of an internal combustion engine which comprises an exhaust purification catalyst arranged in an engine exhaust passage and a hydrocarbon feed valve arranged in the engine exhaust, passage upstream of the exhaust purification catalyst, a precious metal catalyst is carried on an exhaust gas flow surface of the exhaust purification catalyst, a basic layer is formed around the precious metal catalyst, and a first $NO_x$ removal method which reduces $NO_x$ contained in the exhaust gas by a reducing intermediate which is held on the basic layer and generated by injecting hydrocarbons from the hydrocarbon feed valve within a predetermined range of period and a second $NO_x$ removal method in which an air-fuel ratio of the exhaust gas flowing into the exhaust purification catalyst is made rich by a period which is longer than the above-mentioned predetermined range to make $NO_x$ which is stored in the exhaust purification catalyst when the air-fuel ratio of the exhaust gas is lean to be released from the exhaust purification catalyst and be reduced are used, wherein the air-fuel ratio of the exhaust gas flowing into the exhaust purification catalyst is made a first target rich air-fuel ratio by generating a rich air-fuel ratio combustion gas in a combustion chamber when releasing a stored $NO_x$ from the exhaust purification catalyst in case where the second $NO_x$ removal method is being used, and the air-fuel ratio of the exhaust gas flowing into the exhaust purification catalyst is made a second target rich air-fuel ratio which is smaller than the first target rich air-fuel ratio by generating the rich air-fuel ratio combustion gas in the combustion chamber when a $NO_x$ removal method is switched from the second $NO_x$ removal method to the first $NO_x$ removal method.

Advantageous Effects of Invention

When the $NO_x$ removal method is switched from the second $NO_x$ removal method to the first $NO_x$ removal method, since the air-fuel ratio of the exhaust gas flowing into the exhaust purification catalyst is made the second target rich air-fuel ratio which is smaller than the first target rich air-fuel ratio, that is, the amount of injection of fuel into the combustion chamber is increased, even when it is only possible to generate rich air-fuel ratio combustion gas in the combustion chamber for a short time, it is possible to release the stored $NO_x$ well from the exhaust purification catalyst.

DESCRIPTION OF EMBODIMENTS

Figure 1:
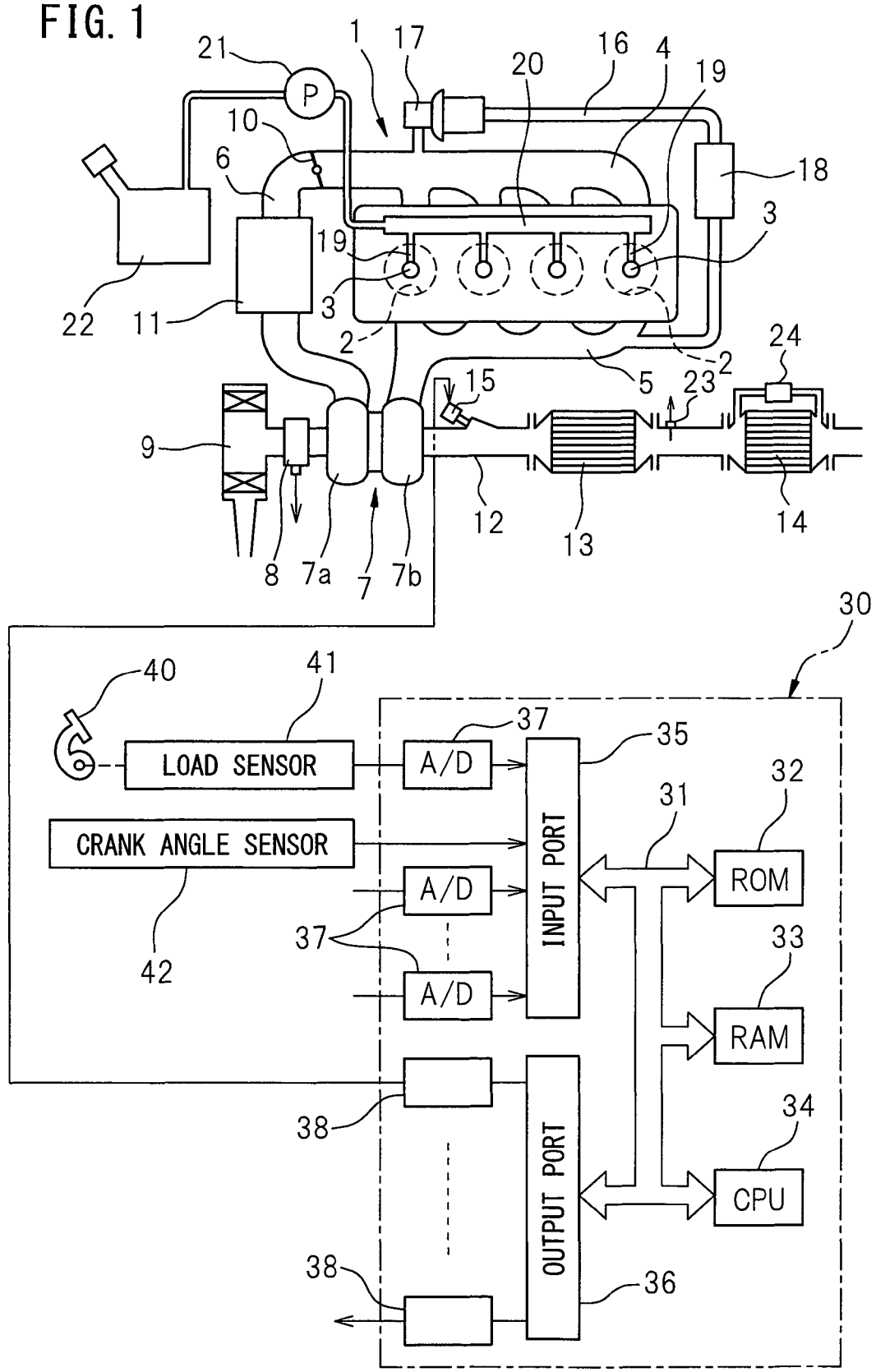
FIG. 1 is an overall view of a compression ignition type internal combustion engine.

FIG. 1 is an overall view of a compression ignition type internal combustion engine.

Referring to FIG. 1, 1 indicates an engine body, 2 a combustion chamber of each cylinder, 3 an electronically controlled fuel injector for injecting fuel into each combustion chamber 2, 4 an intake manifold, and 5 an exhaust manifold. The intake manifold 4 is connected through an intake duct 6 to an outlet of a compressor 7a of an exhaust turbocharger 7, while an inlet of the compressor 7a is connected through an intake air amount detector 8 to an air cleaner 9. Inside the intake duct 6, a throttle valve 10 which is driven by an actuator is arranged. Around the intake duct 6, a cooling device 11 is arranged for cooling the intake air which flows through the inside of the intake duct 6. In the embodiment which is shown in FIG. 1, the engine cooling water is guided to the inside of the cooling device 11 where the engine cooling water is used to cool the intake air.

On the other hand, the exhaust manifold 5 is connected to an inlet of an exhaust turbine 7b of the exhaust turbocharger 7, and an outlet of the exhaust turbine 7b is connected through an exhaust pipe 12 to an inlet of an exhaust purification catalyst 13. In an embodiment of the present invention, this exhaust purification catalyst 13 is comprised of an $NO_x$ storage catalyst 13. An outlet of the exhaust purification catalyst 13 is connected to a particulate filter 14 and, upstream of the exhaust purification catalyst 13 inside the exhaust pipe 12, a hydrocarbon feed valve 15 is arranged for feeding hydrocarbons comprised of diesel oil or other fuel used as fuel for a compression ignition type internal combustion engine. In the embodiment shown in FIG. 1, diesel oil is used as the hydrocarbons which are fed from the hydrocarbon feed valve 15. Note that, the present invention can also be applied to a spark ignition type internal combustion engine in which fuel is burned under a lean air-fuel ratio. In this case, from the hydrocarbon feed valve 15, hydrocarbons comprised of gasoline or other fuel used as fuel of a spark ignition type internal combustion engine are fed.

On the other hand, the exhaust manifold 5 and the intake manifold 4 are connected with each other through an exhaust gas recirculation (hereinafter referred to as an "EGR") passage 16. Inside the EGR passage 16, an electronically controlled EGR control valve 17 is arranged. Further, around the EGR passage 16, a cooling device 18 is arranged for cooling the EGR gas which flows through the inside of the EGR passage 16. In the embodiment which is shown in FIG. 1, the engine cooling water is guided to the inside of the cooling device 18 where the engine cooling water is used to cool the EGR gas. On the other hand, each fuel injector 3 is connected through a fuel feed tube 19 to a common rail 20. This common rail 20 is connected through an electronically controlled variable discharge fuel pump 21 to a fuel tank 22. The fuel which is stored inside of the fuel tank 22 is fed by the fuel pump 21 to the inside of the common rail 20. The fuel which is fed to the inside of the common rail 21 is fed through each fuel feed tube 19 to the fuel injector 3.

An electronic control unit 30 is comprised of a digital computer provided with a ROM (read only memory) 32, a RAM (random access memory) 33, a CPU (microprocessor) 34, an input port 35, and an output port 36, which are connected with each other by a bidirectional bus 31. Downstream of the exhaust purification catalyst 13, a temperature sensor 23 is arranged for detecting the temperature of the exhaust gas flowing out from the exhaust purification catalyst 13, and a pressure difference sensor 24 for detecting a pressure difference before and after the particulate filter 14 is attached to the particulate filter 14. The output signals of these temperature sensor 23, pressure difference sensor 24 and intake air amount detector 8 are input through respectively corresponding AD converters 37 to the input port 35. Further, an accelerator pedal 40 has a load sensor 41 connected to it which generates an output voltage proportional to the amount of depression L of the accelerator pedal 40. The output voltage of the load sensor 41 is input through a corresponding AD converter 37 to the input port 35. Furthermore, at the input port 35, a crank angle sensor 42 is connected which generates an output pulse every time a crankshaft rotates by, for example, 15°. On the other hand, the output port 36 is connected through corresponding drive circuits 38 to each fuel injector 3, the actuator for driving the throttle valve 10, hydrocarbon feed valve 15, EGR control valve 17, and fuel pump 21.

Figure 2:
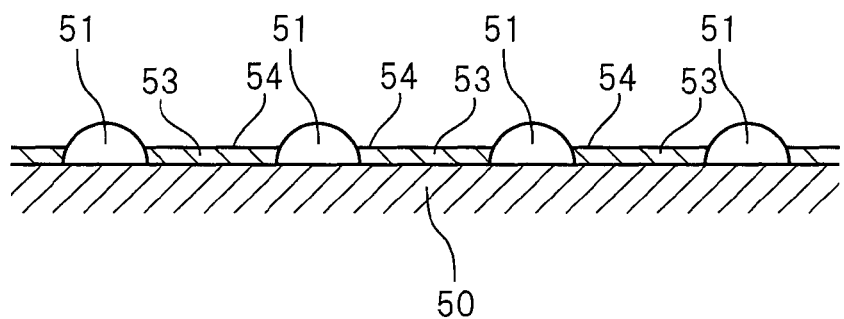
FIG. 2 is a view which schematically shows the surface part of a catalyst carrier.

FIG. 2 schematically shows a surface part of a catalyst carrier which is carried on a substrate of the exhaust purification catalyst 13 shown in FIG. 1. At this exhaust purification catalyst 13, as shown in FIG. 2, for example, there is provided a catalyst carrier 50 made of alumina on which precious metal catalysts 51 comprised of platinum Pt are carried. Furthermore, on this catalyst carrier 50, a basic layer 53 is formed which includes at least one element selected from potassium K, sodium Na, cesium Cs, or another such alkali metal, barium Ba, calcium Ca, or another such alkali earth metal, a lanthanide or another such rare earth and silver Ag, copper Cu, iron Fe, iridium Ir, or another metal able to donate electrons to $NO_x$. In this case, on the catalyst carrier 50 of the exhaust purification catalyst 13, in addition to platinum Pt, rhodium Rh or palladium Pd may be further carried. Note that the exhaust gas flows along the top of the catalyst carrier 50, so the precious metal catalysts 51 can be said to be carried on the exhaust gas flow surfaces of the exhaust purification catalyst 13. Further, the surface of the basic layer 53 exhibits basicity, so the surface of the basic layer 53 is called the "basic exhaust gas flow surface parts 54".

Figure 3:
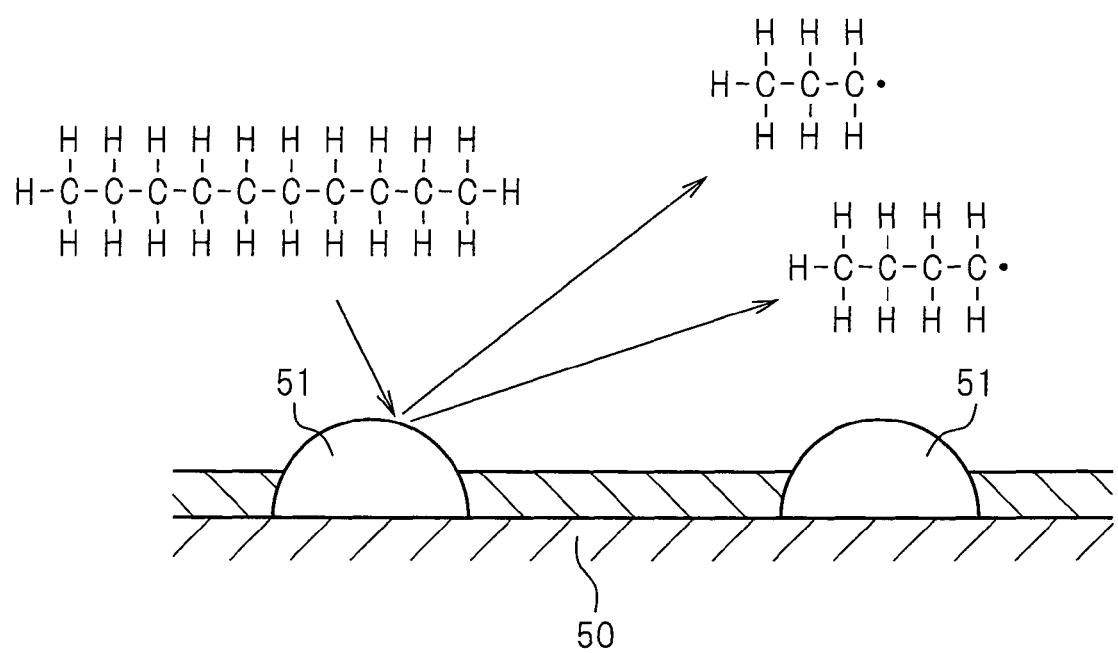
FIG. 3 is a view for explaining an oxidation reaction at an exhaust purification catalyst.

If hydrocarbons are injected from the hydrocarbon feed valve 15 into the exhaust gas, the hydrocarbons are reformed by the exhaust purification catalyst 13. In the present invention, at this time, the reformed hydrocarbons are used to remove the $NO_x$ at the exhaust purification catalyst 13. FIG. 3 schematically shows the reformation action performed at the exhaust purification catalyst 13 at this time. As shown in FIG. 3, the hydrocarbons HC which are injected from the hydrocarbon feed valve 15 become radical hydrocarbons HC with a small carbon number due to the precious metal catalyst 51.

Figure 4:
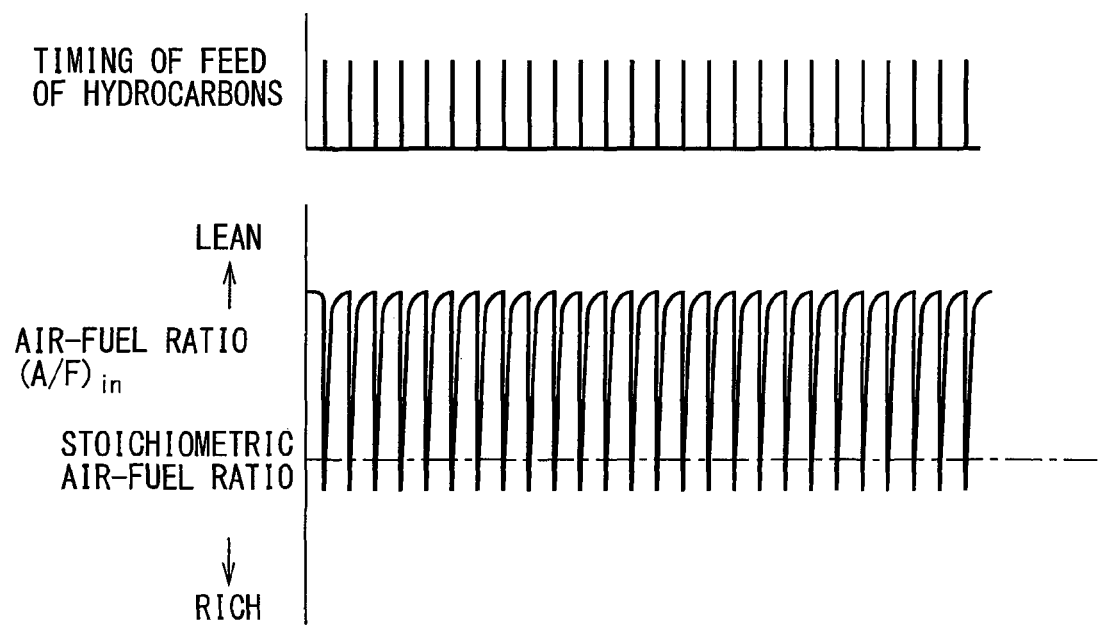
FIG. 4 is a view which shows changes in an air-fuel ratio of exhaust gas which flows into an exhaust purification catalyst.

FIG. 4 shows the feed timing of hydrocarbons from the hydrocarbon feed valve 15 and the change in the air-fuel ratio (A/F) in of the exhaust gas which flows into the exhaust purification catalyst 13. Note that, the change in the air-fuel ratio (A/F) in depends on the change in concentration of the hydrocarbons in the exhaust gas which flows into the exhaust purification catalyst 13, so it can be said that the change in the air-fuel ratio (A/F) in shown in FIG. 4 expresses the change in concentration of the hydrocarbons. However, if the hydrocarbon concentration becomes higher, the air-fuel ratio (A/F) in becomes smaller, so, in FIG. 4, the more to the rich side the air-fuel ratio (A/F) in becomes, the higher the hydrocarbon concentration.

Figure 5:
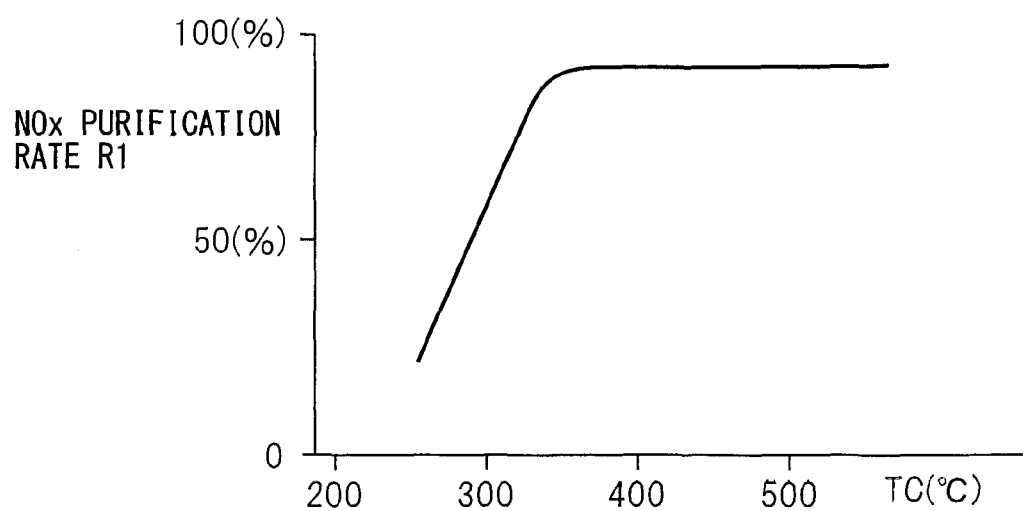
FIG. 5 is a view which shows an $NO_x$ purification rate R1.

FIG. 5 shows the $NO_x$ purification rate R1 by the exhaust purification catalyst 13 with respect to the catalyst temperatures TC of the exhaust purification catalyst 13 when periodically making the concentration of hydrocarbons which flow into the exhaust purification catalyst 13 change so as to, as shown in FIG. 4, periodically make the air-fuel ratio (A/F) in of the exhaust gas flowing to the exhaust purification catalyst 13 rich. In this regard, as a result of a research relating to $NO_x$ purification for a long time, it is learned that if making the concentration of hydrocarbons which flow into the exhaust purification catalyst 13 vibrate by within a predetermined range of amplitude and within a predetermined range of period, as shown in FIG. 5, an extremely high $NO_x$ purification rate R1 is obtained even in a 350° C. or higher high temperature region.

Figure 6A:
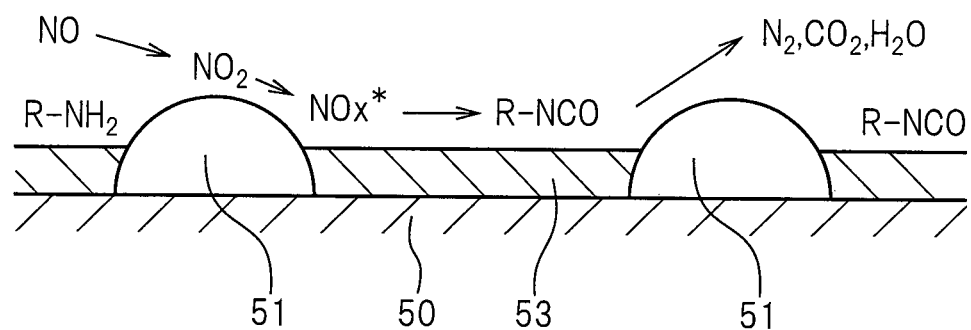
FIGS. 6A and 6B are views for explaining an oxidation reduction reaction in an exhaust purification catalyst.
Figure 6B:
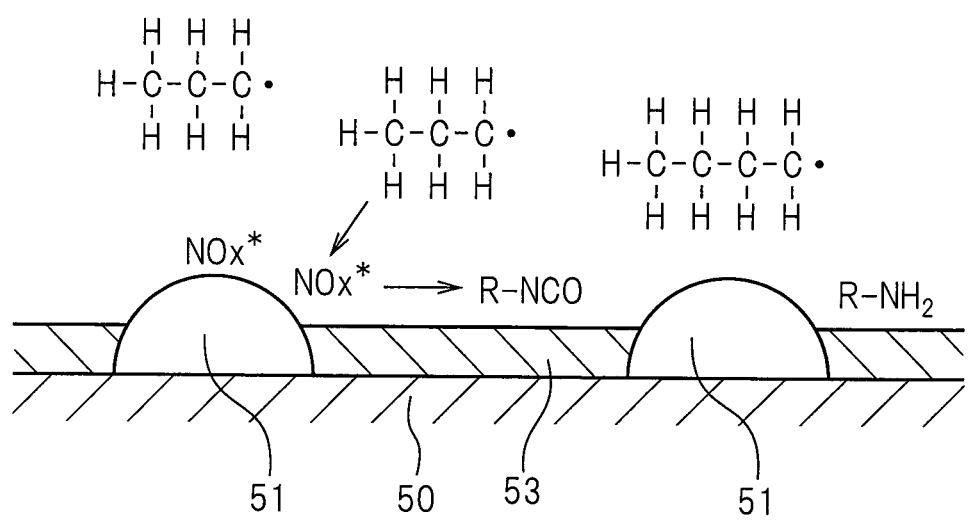

Furthermore, it is learned that at this time, a large amount of reducing intermediates which contain nitrogen and hydrocarbons continues to be held or adsorbed on the surface of the basic layer 53, that is, on the basic exhaust gas flow surface parts 54 of the exhaust purification catalyst 13, and the reducing intermediates play a central role in obtaining a high $NO_x$ purification rate R1. Next, this will be explained with reference to FIGS. 6A and 6B. Note that, these FIGS. 6A and 6B schematically show the surface part of the catalyst carrier 50 of the exhaust, purification catalyst 13. These FIGS. 6A and 6B show the reaction which is presumed to occur when the concentration of hydrocarbons which flow into the exhaust purification catalyst 13 is made to vibrate by within a predetermined range of amplitude and within a predetermined range of period.

FIG. 6A shows when the concentration of hydrocarbons which flow into the exhaust purification catalyst 13 is low, while FIG. 6B shows when hydrocarbons are fed from the hydrocarbon feed valve 15 and the air-fuel ratio (A/F) in of the exhaust gas flowing to the exhaust purification catalyst 13 is made rich, that is, the concentration of hydrocarbons which flow into the exhaust purification catalyst 13 becomes higher.

Now, as will be understood from FIG. 4, the air-fuel ratio of the exhaust gas which flows into the exhaust purification catalyst 13 is maintained lean except for an instant, so the exhaust gas which flows into the exhaust purification catalyst 13 normally becomes a state of oxygen excess. At this time, part of the NO which is contained in the exhaust gas deposits on the exhaust purification catalyst 13, while part of the NO which is contained in the exhaust gas, as shown in FIG. 6A, is oxidized on the platinum 51 and becomes $NO_2$. Next, this $NO_2$ is further oxidized and becomes $NO_3$. Further, part of the $NO_2$ becomes $NO_2^-$. Therefore, on the platinum Pt 51, $NO_2^-$ and $NO_3$ are produced. The NO which is deposited on the exhaust purification catalyst 13 and the $NO_2^-$ and $NO_3$ which are formed on the platinum Pt 51 are strong in activity. Therefore, below, these NO, $NO_2^-$, and $NO_3$ will be referred to as the "active $NO_x^*$".

On the other hand, if hydrocarbons are fed from the hydrocarbon feed valve 15 and the air-fuel ratio (A/F) in of the exhaust gas flowing to the exhaust purification catalyst 13 is made rich, the hydrocarbons successively deposit over the entire exhaust purification catalyst 13. The majority of the deposited hydrocarbons successively react with oxygen and are burned. Part of the deposited hydrocarbons are successively reformed and become radicalized inside of the exhaust purification catalyst 13 as shown in FIG. 3. Therefore, as shown in FIG. 6B, the hydrogen concentration around the active $NO_x^*$ becomes higher. In this regard, if, after the active $NO_x^*$ is produced, the state of a high oxygen concentration around the active $NO_x^*$ continues for a constant time or more, the active $NO_x^*$ is oxidized and is absorbed in the form of nitrate ions $NO_3^-$ inside the basic layer 53. However, if, before this constant time elapses, the hydrocarbon concentration around the active $NO_x^*$ becomes higher, as shown in FIG. 6B, the active $NO_x^*$ reacts on the platinum 51 with the radical hydrocarbons HC to thereby form the reducing intermediates. The reducing intermediates are adhered or adsorbed on the surface of the basic layer 53.

Note that, at this time, the first produced reducing intermediate is considered to be a nitro compound R—$NO_2$. If this nitro compound R—$NO_2$ is produced, the result becomes a nitrile compound R—CN, but this nitrile compound R—CN can only survive for an instant in this state, so immediately becomes an isocyanate compound R—NCO. This isocyanate compound R—NCO becomes an amine compound R—$NH_2$ if hydrolyzed. However, in this case, what is hydrolyzed is considered to be part of the isocyanate compound R—NCO. Therefore, as shown in FIG. 6B, the majority of the reducing intermediates which are held or adsorbed on the surface of the basic layer 53 is believed to be the isocyanate compound R—NCO and amine compound R—$NH_2$.

On the other hand, as shown in FIG. 6B, if the produced reducing intermediates are surrounded by the hydrocarbons HC, the reducing intermediates are blocked by the hydrocarbons HC and the reaction will not proceed any further. In this case, if the concentration of hydrocarbons which flow into the exhaust purification catalyst 13 is lowered and then the hydrocarbons which are deposited around the reducing intermediates will be oxidized and consumed, and thereby the concentration of oxygen around the reducing intermediates becomes higher, the reducing intermediates react with the $NO_x$ in the exhaust gas, react with the active $NO_x$*, react with the surrounding oxygen, or break down on their own. Due to this, the reducing intermediates R—NCO and R—$NH_2$ are converted to $N_2$, $CO_2$, and $H_2O$ as shown in FIG. 6A, therefore the $NO_x$ is removed.

In this way, in the exhaust purification catalyst 13, when the concentration of hydrocarbons which flow into the exhaust purification catalyst 13 is made higher, reducing intermediates are produced, and after the concentration of hydrocarbons which flow into the exhaust purification catalyst 13 is lowered, when the oxygen concentration is raised, the reducing intermediates react with the $NO_x$ in the exhaust gas or the active $NO_x$* or oxygen or break down on their own whereby the $NO_x$ is removed. That is, in order for the exhaust purification catalyst 13 to remove the $NO_x$, the concentration of hydrocarbons which flow into the exhaust purification catalyst 13 has to be periodically changed.

Of course, in this case, it is necessary to raise the hydrocarbon concentration to a concentration sufficiently high for producing the reducing intermediates and it is necessary to lower the hydrocarbon concentration to a concentration sufficiently low for making the produced reducing intermediates react with the $NO_x$ in the exhaust gas or the active $NO_x$* or oxygen or break down on their own. That is, it is necessary to make the concentration of hydrocarbons which flow into the exhaust purification catalyst 13 vibrate by within a predetermined range of amplitude. Note that, in this case, it is necessary to hold these reducing intermediates on the basic layer 53, that is, the basic exhaust gas flow surface parts 54, until the produced reducing intermediates R—NCO and R—$NH_2$ react with the $NO_x$ in the exhaust gas or the active $NO_x$* or oxygen or break down themselves. For this reason, the basic exhaust gas flow surface parts 54 are provided.

On the other hand, if lengthening the feed period of the hydrocarbons, the time until the oxygen concentration becomes higher becomes longer in the period after the hydrocarbons are fed until the hydrocarbons are next fed. Therefore, the active $NO_x$* is absorbed in the basic layer 53 in the form of nitrates without producing reducing intermediates. To avoid this, it is necessary to make the concentration of hydrocarbons which flow into the exhaust purification catalyst 13 vibrate by within a predetermined range of period.

Therefore, in the embodiment according to the present invention, to react the $NO_x$ contained in the exhaust gas and the reformed hydrocarbons and produce the reducing intermediates R—NCO and R—$NH_2$ containing nitrogen and hydrocarbons, the precious metal catalysts 51 are carried on the exhaust gas flow surfaces of the exhaust purification catalyst 13. To hold the produced reducing intermediates R—NCO and R—$NH_2$ inside the exhaust purification catalyst 13, the basic layers 53 are formed around the precious metal catalysts 51. The reducing intermediates R—NCO and R—$NH_2$ which are held on the basic layer 53 are converted to $N_2$, $CO_2$, and $H_2O$. The vibration period of the hydrocarbon concentration is made the vibration period required for continuation of the production of the reducing intermediates R—NCO and R—$NH_2$. Incidentally, in the example shown in FIG. 4, the injection interval is made 3 seconds.

Figure 7A:
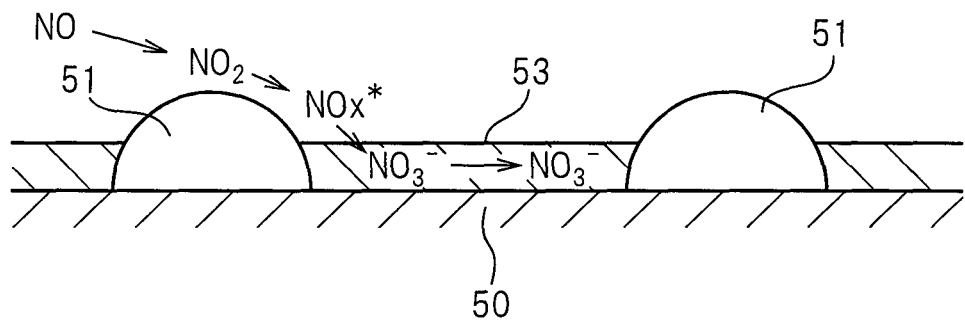
FIGS. 7A and 7B are views for explaining an oxidation reduction reaction in an exhaust purification catalyst.

If the vibration period of the hydrocarbon concentration, that is, the injection period of hydrocarbons from the hydrocarbon feed valve 15, is made longer than the above predetermined range of period, the reducing intermediates R—NCO and R—$NH_2$ disappear from the surface of the basic layer 53. At this time, the active $NO_x$* which is produced on the platinum Pt 53, as shown in FIG. 7A, diffuses in the basic layer 53 in the form of nitrate ions $NO_3^-$ and becomes nitrates. That is, at this time, the $NO_x$ in the exhaust gas is absorbed in the form of nitrates inside of the basic layer 53.

Figure 7B:
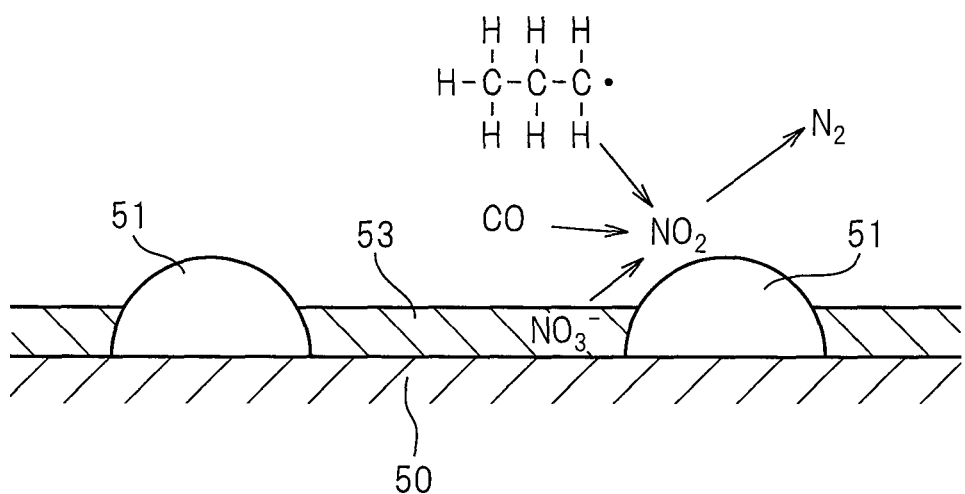

On the other hand, FIG. 7B shows the case where the air-fuel ratio of the exhaust gas which flows into the exhaust purification catalyst 13 is made rich when the $NO_x$ is absorbed in the form of nitrates inside of the basic layer 53. In this case, the oxygen concentration in the exhaust gas falls, so the reaction proceeds in the opposite direction ($NO_3^- \rightarrow NO_2$), and consequently the nitrates absorbed in the basic layer 53 successively become nitrate ions $NO_3^-$ and, as shown in FIG. 7B, are released from the basic layer 53 in the form of $NO_2$. Next, the released $NO_2$ is reduced by the hydrocarbons HC and CO contained in the exhaust gas.

Figure 8:
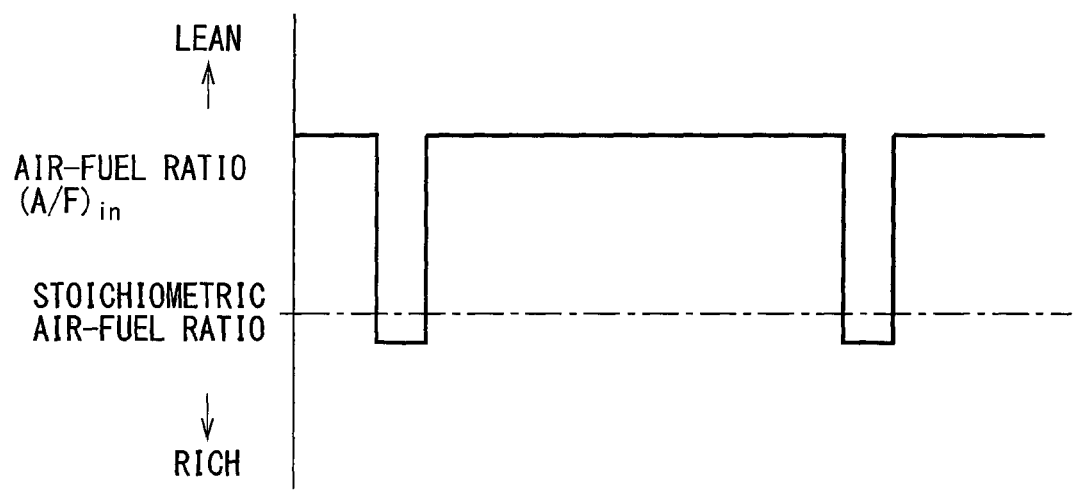
FIG. 8 is a view which shows changes in an air-fuel ratio of exhaust gas which flows into an exhaust purification catalyst.

FIG. 8 shows the case of making the air-fuel ratio (A/F) in of the exhaust gas which flows into the exhaust purification catalyst 13 temporarily rich slightly before the $NO_x$ absorption ability of the basic layer 53 becomes saturated. Note that, in the example shown in FIG. 8, the time interval of this rich control is 1 minute or more. In this case, the $NO_x$ which was absorbed in the basic layer 53 when the air-fuel ratio (A/F) in of the exhaust gas was lean is released all at once from the basic layer 53 and reduced when the air-fuel ratio (A/F) in of the exhaust gas is made temporarily rich. Therefore, in this case, the basic layer 53 plays the role of an absorbent for temporarily absorbing $NO_x$.

Note that, at this time, sometimes the basic layer 53 temporarily adsorbs the $NO_x$. Therefore, if using term of "storage" as a term including both "absorption" and "adsorption", at this time, the basic layer 53 performs the role of an $NO_x$ storage agent for temporarily storing the $NO_x$. That is, in this case, if the ratio of the air and fuel (hydrocarbons) which are supplied into the engine intake passage, combustion chambers 2, and upstream of the exhaust purification catalyst 13 in the exhaust passage is referred to as "the air-fuel ratio of the exhaust gas", the exhaust purification catalyst 13 functions as an $NO_x$ storage catalyst which stores the $NO_x$ when the air-fuel ratio of the exhaust gas is lean and releases the stored $NO_x$ when the oxygen concentration in the exhaust gas falls.

Figure 9:
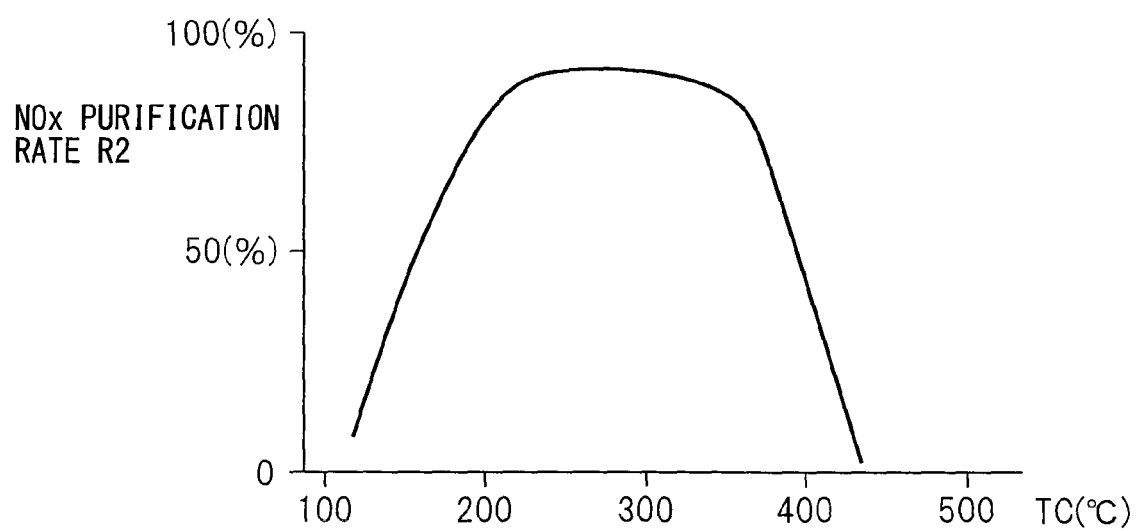
FIG. 9 is a view which shows an $NO_x$ purification rate R2.

The solid line of FIG. 9 shows the $NO_x$ purification rate R2 when making the exhaust purification catalyst 13 function as an $NO_x$ storage catalyst in this way. Note that, the abscissa of the FIG. 9 shows the catalyst temperature TC of the exhaust purification catalyst 13. When making the exhaust purification catalyst 13 function as an $NO_x$ storage catalyst, as shown in FIG. 9, when the catalyst temperature TC is 250° C. to 300° C., an extremely high $NO_x$ purification rate is obtained, but when the catalyst temperature TC becomes a 350° C. or higher high temperature, the $NO_x$ purification rate R2 falls.

In this way, when the catalyst temperature TC becomes 350° C. or more, the $NO_x$ purification rate R2 falls because if the catalyst temperature TC becomes 350° C. or more, $NO_x$ is less easily stored and the nitrates break down by heat and are released in the form of $NO_2$ from the exhaust purification catalyst 13. That is, so long as storing $NO_x$ in the form of nitrates, when the catalyst temperature TC is high, it is difficult to obtain a high $NO_x$ purification rate R2. However, in the new $NO_x$ purification method shown from FIG. 4 to FIGS. 6A and 6B, the amount of $NO_x$ stored in the form of nitrates is small, and consequently, as shown in FIG. 5, even when the catalyst temperature TC is high, a high $NO_x$ purification rate R1 is obtained.

In the embodiment according to the present invention, to be able to purify $NO_x$ by using this new $NO_x$ purification method, a hydrocarbon feed valve 15 for feeding hydrocarbons is arranged in the engine exhaust passage, an exhaust purification catalyst 13 is arranged in the engine exhaust passage downstream of the hydrocarbon feed valve 15, precious metal catalysts 51 are carried on the exhaust gas flow surfaces of the exhaust purification catalyst 13, the basic layers 53 are formed around the precious metal catalysts 51, the exhaust purification catalyst 13 has the property of reducing the $NO_x$ contained in exhaust gas by the reducing intermediates which are held on the basic layers 53 if hydrocarbons are injected from the hydrocarbon feed valve 15 within a predetermined range of period and has the property of being increased in storage amount of $NO_x$ contained in exhaust gas if making the injection period of the hydrocarbon from the hydrocarbon feed valve 15 longer than this predetermined range, and, at the time of engine operation, the hydrocarbons are injected from the hydrocarbon feed valve 15 within the predetermined range of period to thereby reduce the $NO_x$ which is contained in the exhaust gas in the exhaust purification catalyst 13.

That is, the $NO_x$ purification method which is shown from FIG. 4 to FIGS. 6A and 6B can be said to be a new $NO_x$ purification method designed to remove $NO_x$ without forming so much nitrates in the case of using an exhaust purification catalyst which carries precious metal catalysts and forms a basic layer which can absorb $NO_x$. In actuality, when using this new $NO_x$ purification method, the nitrates which are detected from the basic layer 53 are smaller in amount compared with the case where making the exhaust purification catalyst 13 function as an $NO_x$ storage catalyst. Note that, this new $NO_x$ purification method will be referred to below as the "first $NO_x$ removal method".

Figure 10:
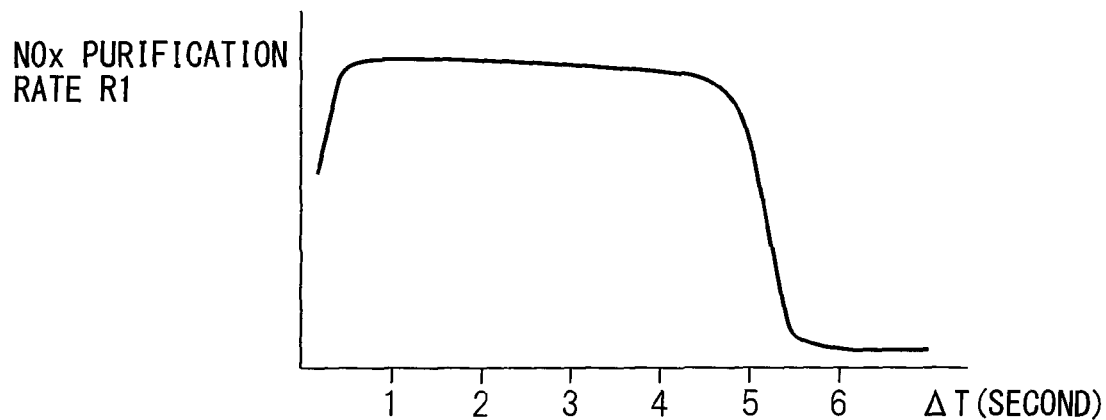
FIG. 10 is a view which shows a relationship between a vibration period $\Delta T$ of hydrocarbon concentration and an $NO_x$ purification rate R1.

Now, as mentioned before, if the injection period $\Delta T$ of the hydrocarbons from the hydrocarbon feed valve 15 becomes longer, the time period in which the oxygen concentration around the active $NO_x^*$ becomes higher becomes longer in the time period after the hydrocarbons are injected to when the hydrocarbons are next injected. In this case, in the embodiment shown in FIG. 1, if the injection period $\Delta T$ of the hydrocarbons becomes longer than about 5 seconds, the active $NO_x^*$ starts to be absorbed in the form of nitrates inside the basic layer 53. Therefore, as shown in FIG. 10, if the vibration period $\Delta T$ of the hydrocarbon concentration becomes longer than about 5 seconds, the $NO_x$ purification rate R1 falls. Therefore, the injection period $\Delta T$ of the hydrocarbons has to be made 5 seconds or less.

On the other hand, in the embodiment of the present invention, if the injection period $\Delta T$ of the hydrocarbons becomes about 0.3 second or less, the injected hydrocarbons start to build up on the exhaust gas flow surfaces of the exhaust purification catalyst 13, therefore, as shown in FIG. 10, if the injection period $\Delta T$ of the hydrocarbons becomes about 0.3 second or less, the $NO_x$ purification rate R1 falls. Therefore, in the embodiment according to the present invention, the injection period of the hydrocarbons is made from 0.3 second to 5 seconds.

Figure 11A:
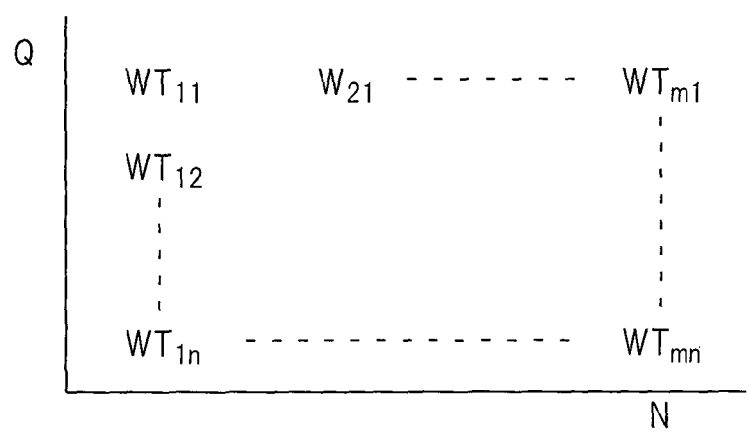
FIGS. 11A and 11B are views which show maps of the injection amount of hydrocarbons etc.
Figure 11B:
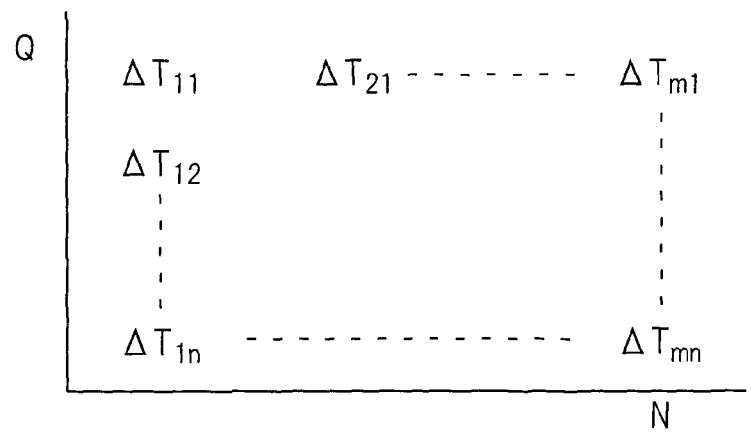

In the embodiment according to the present invention, the injection amount and injection timing of hydrocarbons from the hydrocarbon feed valve 15 which are optimum for ensuring a good $NO_x$ purification action by the first $NO_x$ removal method are obtained in advance. In this case, in the embodiment according to the present invention, the optimum hydrocarbon injection amount WT when the $NO_x$ purification action by the first $NO_x$ removal method is performed, is stored as a function of the injection amount Q from fuel injectors 3 and the engine speed N in the form of a map such as shown in FIG. 11A in advance in the ROM 32. Further, the optimum injection period $\Delta T$ of the hydrocarbons at this time is also stored as a function of the injection amount Q from the fuel injectors 3 and the engine speed N in the form of a map such as shown in FIG. 11B in advance in the ROM 32.

Next, referring to FIG. 12 to FIG. 15, an $NO_x$ purification method when making the exhaust purification catalyst 13 function as an $NO_x$ storage catalyst will be explained specifically. The $NO_x$ purification method in the case of making the exhaust purification catalyst 13 function as an $NO_x$ storage catalyst in this way will be referred to below as the "second $NO_x$ removal method".

Figure 12:
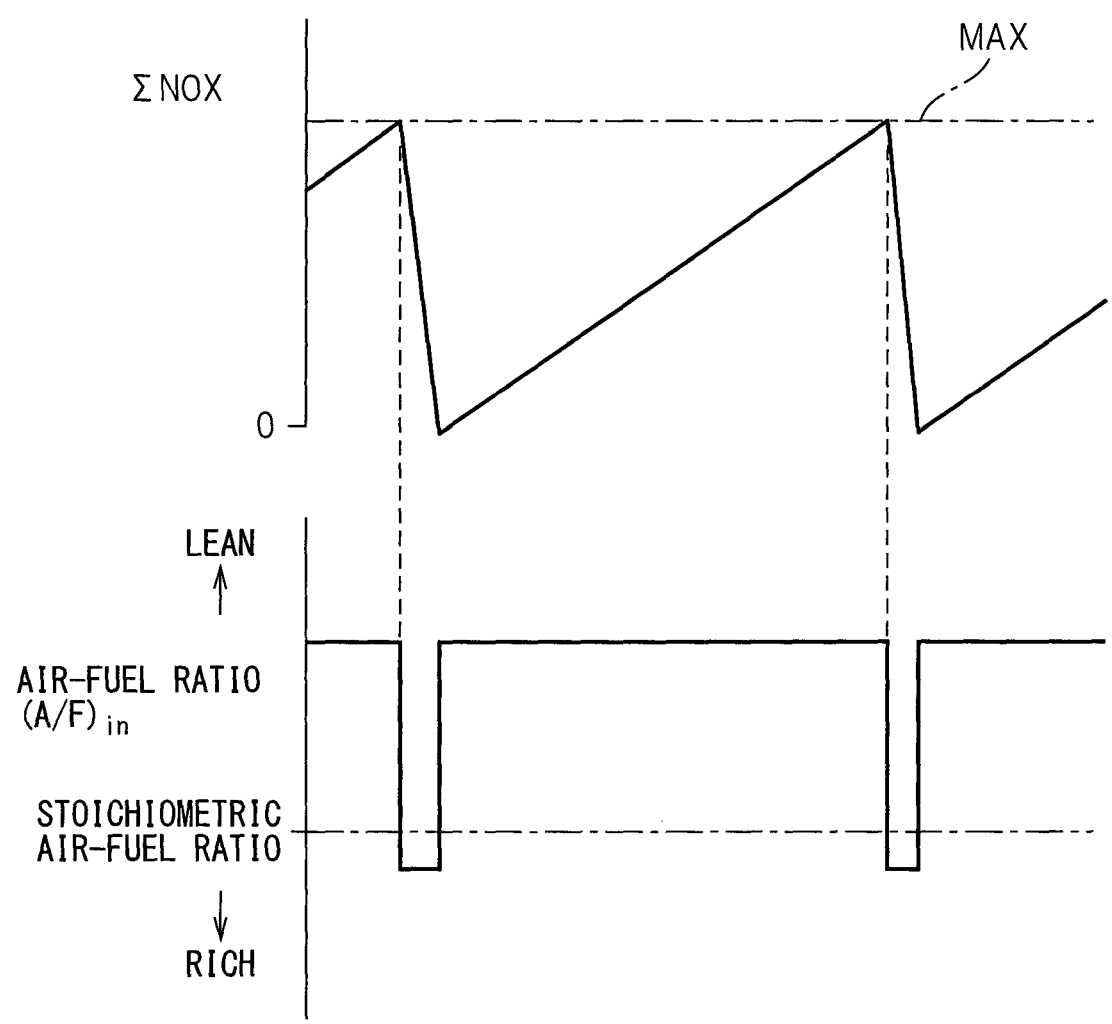
FIG. 12 is a view which shows an $NO_x$ release control.

In this second $NO_x$ removal method, as shown in FIG. 12, when the stored $NO_x$ amount $NO_x$ of $NO_x$ which is stored in the basic layer 53 exceeds a predetermined allowable amount MAX, the air-fuel ratio (A/F) in of the exhaust gas flowing into the exhaust purification catalyst 13 is temporarily made rich. If the air-fuel ratio (A/F) in of the exhaust gas is made rich, the $NO_x$ which was stored in the basic layer 53 when the air-fuel ratio (A/F) in of the exhaust gas was lean is released from the basic layer 53 all at once and reduced. Due to this, the $NO_x$ is removed.

Figure 13:
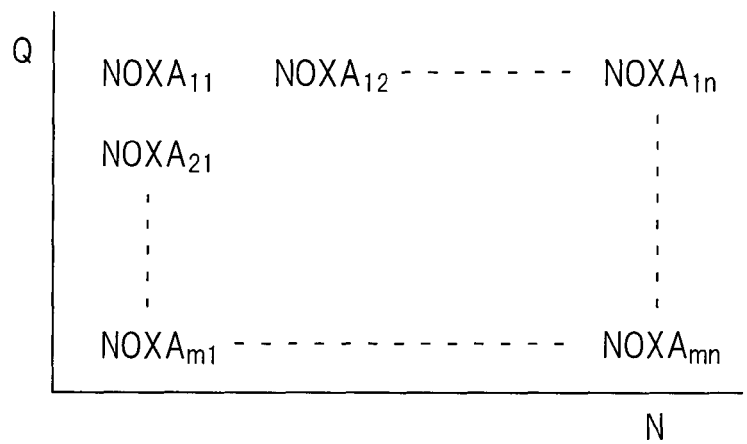
FIG. 13 is a view which shows a map of an exhausted $NO_x$ amount NOXA.

The stored $NO_x$ amount $\Sigma NO_x$ is, for example, calculated from the amount of $NO_x$ which is exhausted from the engine. In this embodiment according to the present invention, the exhausted $NO_x$ amount NOXA of $NO_x$ which is exhausted from the engine per unit time is stored as a function of the injection amount Q and engine speed N in the form of a map such as shown in FIG. 13 in advance in the ROM 32. The stored $NO_x$ amount $\Sigma NO_x$ is calculated from this exhausted $NO_x$ amount NOXA. In this case, as explained before, the period at which the air-fuel ratio (A/F) in of the exhaust gas is made rich is usually 1 minute or more.

Figure 14:
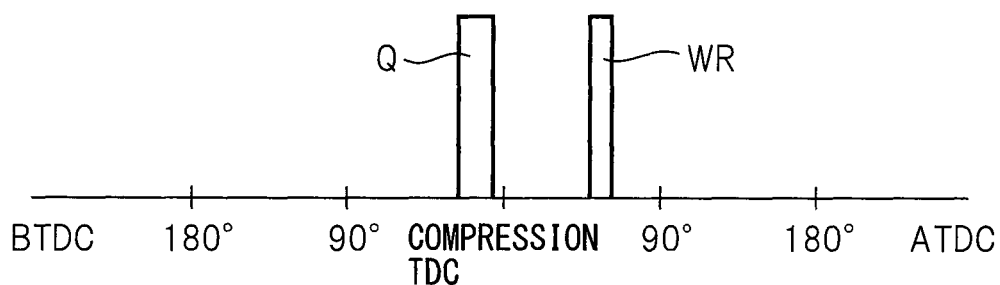
FIG. 14 is a view which shows a fuel injection timing.
Figure 15:
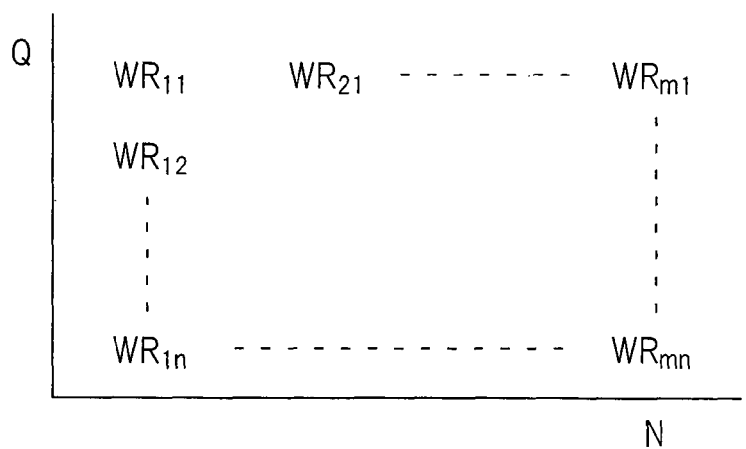
FIG. 15 is a view which shows a map of an amount WR of injection for generating rich combustion gas.

In this second $NO_x$ removal method, when performing $NO_x$ release control, as shown in FIG. 14, the fuel injector 3 performs not only the main injection Q for generating engine output, but also injection WR for generating rich combustion gas. Note that, in FIG. 14, the abscissa shows the crank angle. This injection WR for generating rich combustion gas is performed at a timing where the gas is burned, but does not appear as engine output, that is, is performed a little before after top dead center ATDC90° of the compression stroke. At this time, the amount WR of fuel which is required for generating rich air-fuel ratio combustion gas is injected from the fuel injector 3. This fuel amount WR is stored as a function of the amount L of depression of the accelerator pedal 40 and engine speed N in the form of a map such as shown in FIG. 15. In this way, in an embodiment according to the present invention, when performing control for release of $NO_x$, in addition to the main injection Q for generating engine output, injection WR for generating rich combustion gas is performed from the fuel injector 3 for generating rich air-fuel ratio combustion gas. If this injection WR for generating rich combustion gas is performed, the air-fuel ratio of the exhaust gas which is exhausted from the combustion chamber 2 becomes rich and, therefore, the air-fuel ratio (A/F) in of the exhaust gas which flows into the $NO_x$ storage catalyst 13 becomes rich. As a result, $NO_x$ is released from the $NO_x$ storage catalyst 13.

Now then, in an embodiment according to the present invention, the first $NO_x$ removal method which reduces $NO_x$ contained in the exhaust gas by the reducing intermediate which is held on the basic layer 53 and generated by injecting hydrocarbons from the hydrocarbon feed valve 15 within the predetermined range of period and a second $NO_x$ removal method in which the air-fuel ratio of the exhaust gas flowing into the exhaust purification catalyst 13 is made rich by a period which is longer than the predetermined range to make $NO_x$ which is stored in the exhaust purification catalyst 13 when the air-fuel ratio of the exhaust gas is lean to be released from the exhaust purification catalyst 13 and be reduced are used. In this case, as will be understood if comparing the $NO_x$ removal rate R1 by the first $NO_x$ removal method which is shown in FIG. 5 and the $NO_x$ removal rate R2 by the second $NO_x$ removal method which is shown in FIG. 9, when the catalyst temperature TC is relatively low, the $NO_x$ removal rate R2 by the second $NO_x$ removal method becomes higher, while if the catalyst temperature TC becomes higher, the $NO_x$ removal rate R1 by the first $NO_x$ removal method becomes higher. Therefore, in an embodiment according to the present invention, generally speaking, if the catalyst temperature TC is low, the second $NO_x$ removal method is used, while if the catalyst temperature TC is high, the first $NO_x$ removal method is used.

Figure 16:
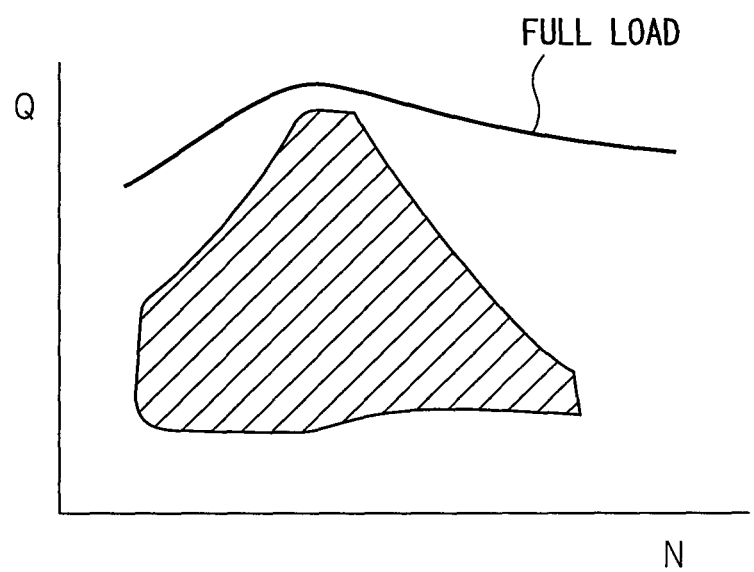
FIG. 16 is a view which shows an engine operating state in which a rich air-fuel ratio combustion gas can be generated in a combustion chamber.

Now then, as explained above, when the second $NO_x$ removal method is being performed and the stored $NO_x$ is released from the exhaust purification catalyst 13, injection WR for generating rich combustion gas is performed to generate rich air-fuel ratio combustion gas in the combustion chamber 2. In this regard, if this injection WR for generating rich combustion gas is performed, additional fuel is injected from the fuel injector 3, so the combustion temperature in the combustion chamber 2 rises. Therefore, if injection WR for generating rich combustion gas is performed at the time of engine high speed, high load operation wherein the temperature inside the combustion chamber 2 becomes high, the temperature inside the combustion chamber 2 becomes excessively high. Therefore at the time of engine high speed, high load operation, injection WR for generating rich combustion gas is difficult to perform. The hatching in FIG. 16 shows the operating region of the engine where this injection WR for generating rich combustion gas can be performed. Note that, in FIG. 16, the abscissa shows the engine speed N, while the ordinate shows the amount Q of fuel injected from the fuel injector 3.

As will be understood from FIG. 16, at the time of engine high speed, high load operation, injection WR for generating rich combustion gas cannot be performed. Therefore, in an embodiment according to the present invention, at the time of engine high speed, high load operation, control to release $NO_x$ from the exhaust purification catalyst 13 is stopped. In this regard, as explained above, in an embodiment according to the present invention, when the catalyst temperature TC is low, the second $NO_x$ removal method is used, while if the catalyst temperature TC is high, the first $NO_x$ removal method is used. That is, generally speaking, at the time of an engine operating state with a relatively low catalyst temperature TC which is shown by the hatching in FIG. 16, the second $NO_x$ removal method is used, while at the time of engine high speed, high load operation where the catalyst temperature TC becomes high, the first $NO_x$ removal method is used. Therefore, when the second $NO_x$ removal method is being used, normally it is possible to perform injection WR for generating rich combustion gas. Therefore, usually, it is possible to release the stored $NO_x$ well from the exhaust purification catalyst 13 by performing injection WR for generating rich combustion gas.

In this regard, if $NO_x$ is stored in the exhaust purification catalyst 13, the basicity of the basic layer 53 is weakened, therefore the ability to generate a reducing intermediate and hold the generated reducing intermediate becomes weaker. Therefore, if $NO_x$ is stored in the exhaust purification catalyst 13 when the first $NO_x$ removal method is used, the $NO_x$ purification rate falls. That is, if the $NO_x$ removal method is switched from the second $NO_x$ removal method to the first $NO_x$ removal method in the state where $NO_x$ is stored in the exhaust purification catalyst 13, when the first $NO_x$ removal method is used, the $NO_x$ purification rate falls. Further, if the $NO_x$ removal method is switched from the second $NO_x$ removal method to the first $NO_x$ removal method in the state where $NO_x$ is stored in the exhaust purification catalyst 13, if the temperature of the exhaust purification catalyst 13 rises after the first $NO_x$ removal method is started, $NO_x$ is released from the exhaust purification catalyst without being reduced.

Therefore, when the $NO_x$ removal method is switched from the second $NO_x$ removal method to the first $NO_x$ removal method, if $NO_x$ is stored in the exhaust purification catalyst 13, it is necessary to release the stored $NO_x$ from the exhaust purification catalyst 13. For this reason, when the $NO_x$ removal method is switched from the second $NO_x$ removal method to the first $NO_x$ removal method, it is necessary to perform injection WR for generating rich combustion gas. However, in this case, to release the $NO_x$ well from the exhaust purification catalyst 13, it is necessary to continue to make the air-fuel ratio of the exhaust gas which flowing into the exhaust purification catalyst 13 rich over a sufficient time in the same way as when releasing the $NO_x$ in case where the second $NO_x$ removal method is being used. That is, at this time, to release $NO_x$ well from the exhaust purification catalyst 13, it is necessary to continue to perform injection WR for generating rich combustion gas over a sufficient time in the same way as when releasing the $NO_x$ in case where the second $NO_x$ removal method is being used.

On the other hand, as explained above, at the time of the engine operating state where the catalyst temperature TC is relatively low such as shown by the hatching in FIG. 16, the second $NO_x$ removal method is used, and if the engine operating state becomes a high speed, high load operating state and, the catalyst temperature TC rises, the $NO_x$ removal method is switched from the second $NO_x$ removal method to the first $NO_x$ removal method. At this time, that is, when the $NO_x$ removal method is switched from the second $NO_x$ removal method to the first $NO_x$ removal method, to release $NO_x$ well from the exhaust purification catalyst 13, as explained above, it becomes necessary to continue the injection WR for generating rich combustion gas over a sufficient time period in the same way as when releasing the $NO_x$ in case where the second $NO_x$ removal method is being used. However, at this time, the time period during which the engine operating state remains at the operating state which is shown by the hatching in FIG. 16 is short. Therefore, in many cases, it becomes impossible to continue the injection WR for generating rich combustion gas over a sufficient time period in the same way as when releasing the $NO_x$ in case where the second $NO_x$ removal method is being used.

That is, the engine operating state which enables the combustion chamber to generate rich air-fuel ratio combustion gas is limited, and therefore, when the $NO_x$ removal method is switched from the second $NO_x$ removal method to the first $NO_x$ removal method, sometimes sufficient time cannot be obtained for releasing the stored $NO_x$ from the exhaust purification catalyst. Therefore, in the present invention, when the $NO_x$ removal method is switched from the second $NO_x$ removal method to the first $NO_x$ removal method, to enable sufficient time to be obtained for releasing the stored $NO_x$ from the exhaust purification catalyst 13, the degree of richness of the air-fuel ratio of the exhaust-gas flowing into the exhaust purification catalyst 13 is raised compared with when the second $NO_x$ removal method is being used.

That is, in the present invention, the air-fuel ratio of the exhaust gas flowing into the exhaust purification catalyst 13 is made a first target rich air-fuel ratio by generating the rich air-fuel ratio combustion gas in the combustion chamber 2 when releasing the stored $NO_x$ from the exhaust purification catalyst 13 in case where the second $NO_x$ removal method is being used, and the air-fuel ratio of the exhaust gas flowing into the exhaust purification catalyst 13 is made a second target rich air-fuel ratio which is smaller than the first target rich air-fuel ratio by generating the rich air-fuel ratio combustion gas in the combustion chamber 2 when the $NO_x$ removal method is switched from the second $NO_x$ removal method to the first $NO_x$ removal method. Next, several embodiments for working the present invention will be explained while referring to FIG. 17 to FIG. 20.

Figure 17:
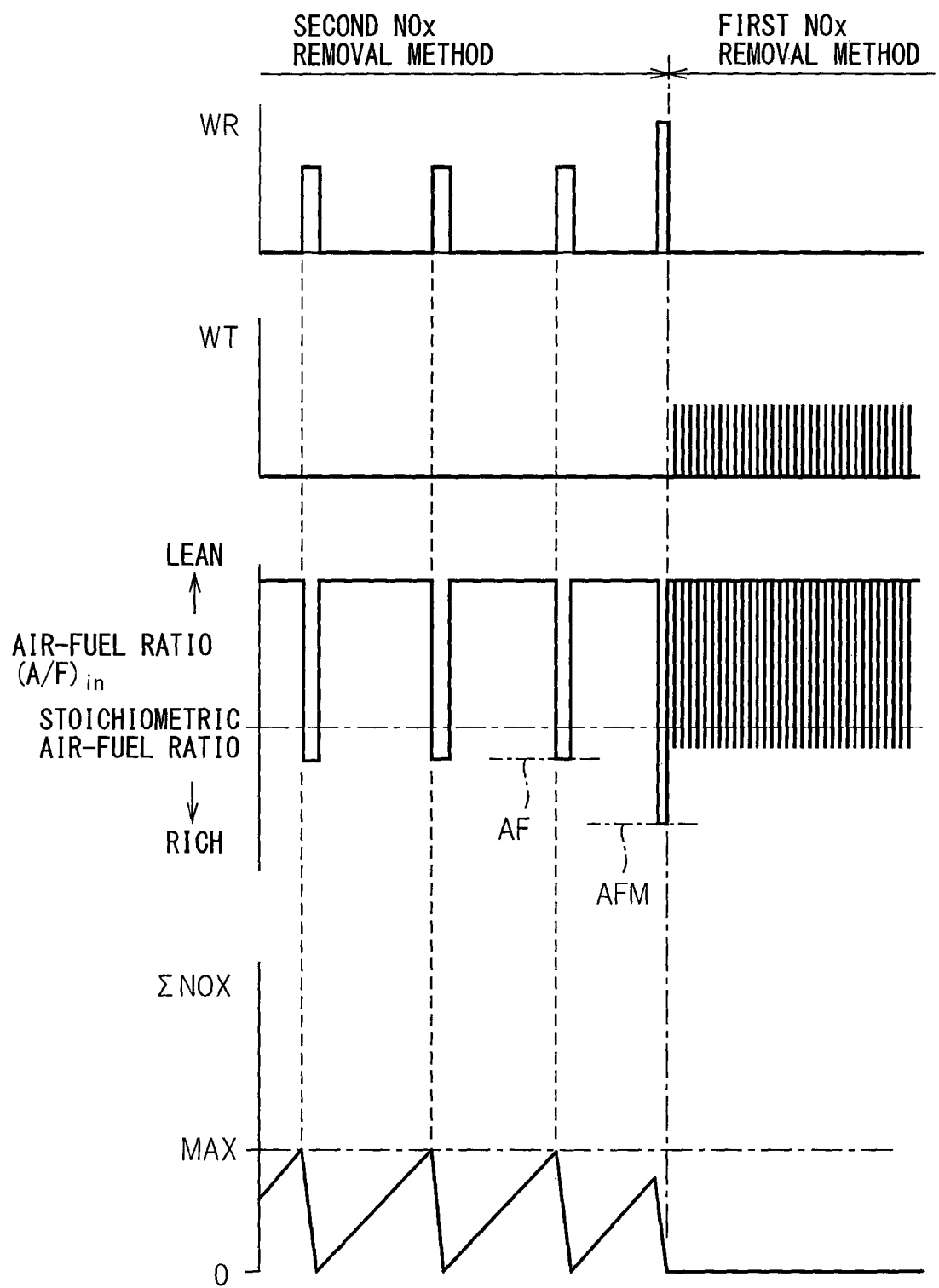
FIG. 17 is a view which shows a change in an air-fuel ratio of an inflowing exhaust gas into an exhaust purification catalyst, etc. when an $NO_x$ removal method is switched from a second $NO_x$ removal method to a first $NO_x$ removal method.
Figure 18:
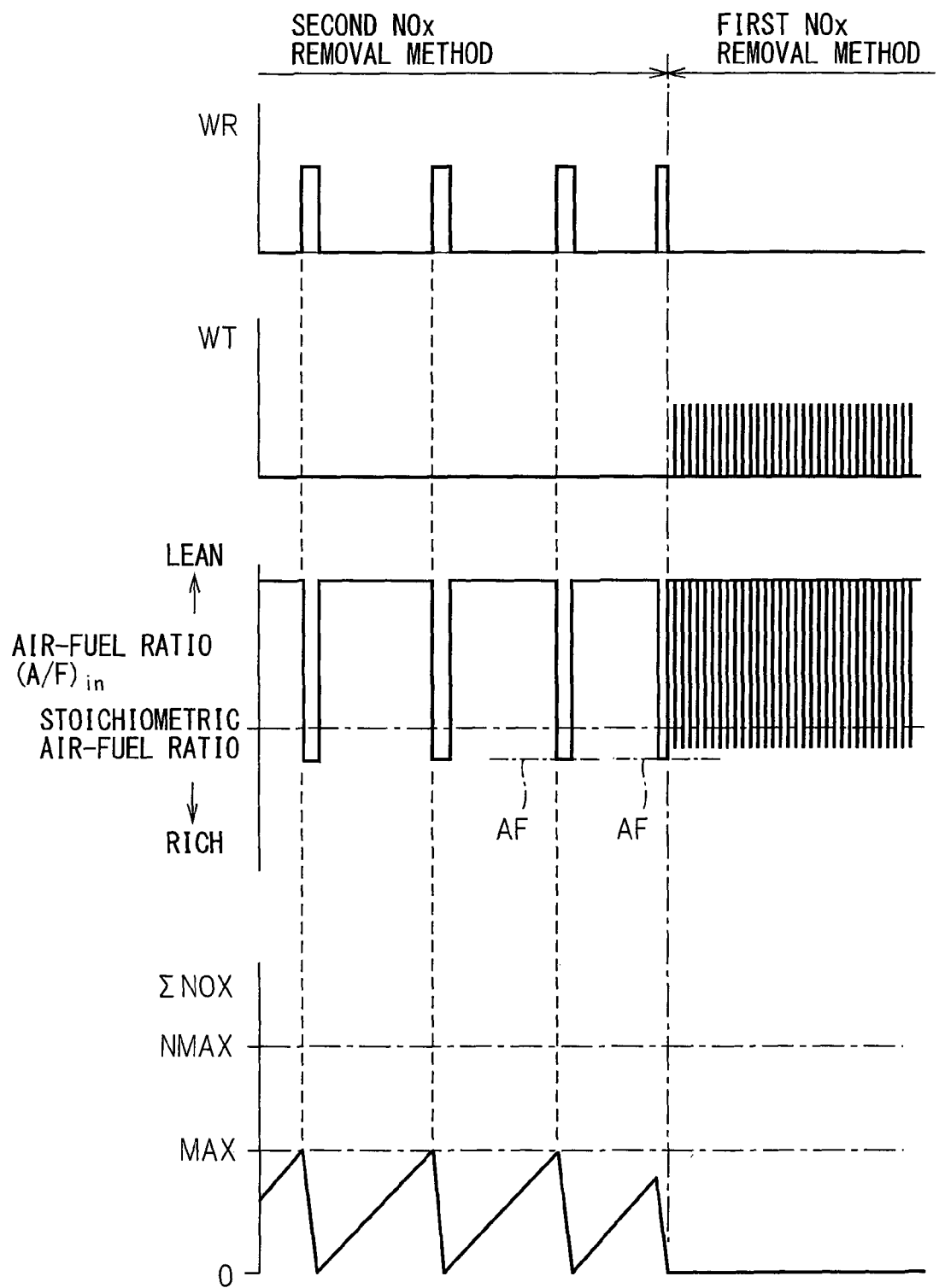
FIG. 18 is a view which shows a change in an air-fuel ratio of an inflowing exhaust gas into an exhaust purification catalyst, etc. when an $NO_x$ removal method is switched from a second $NO_x$ removal method to a first $NO_x$ removal method.
Figure 19:
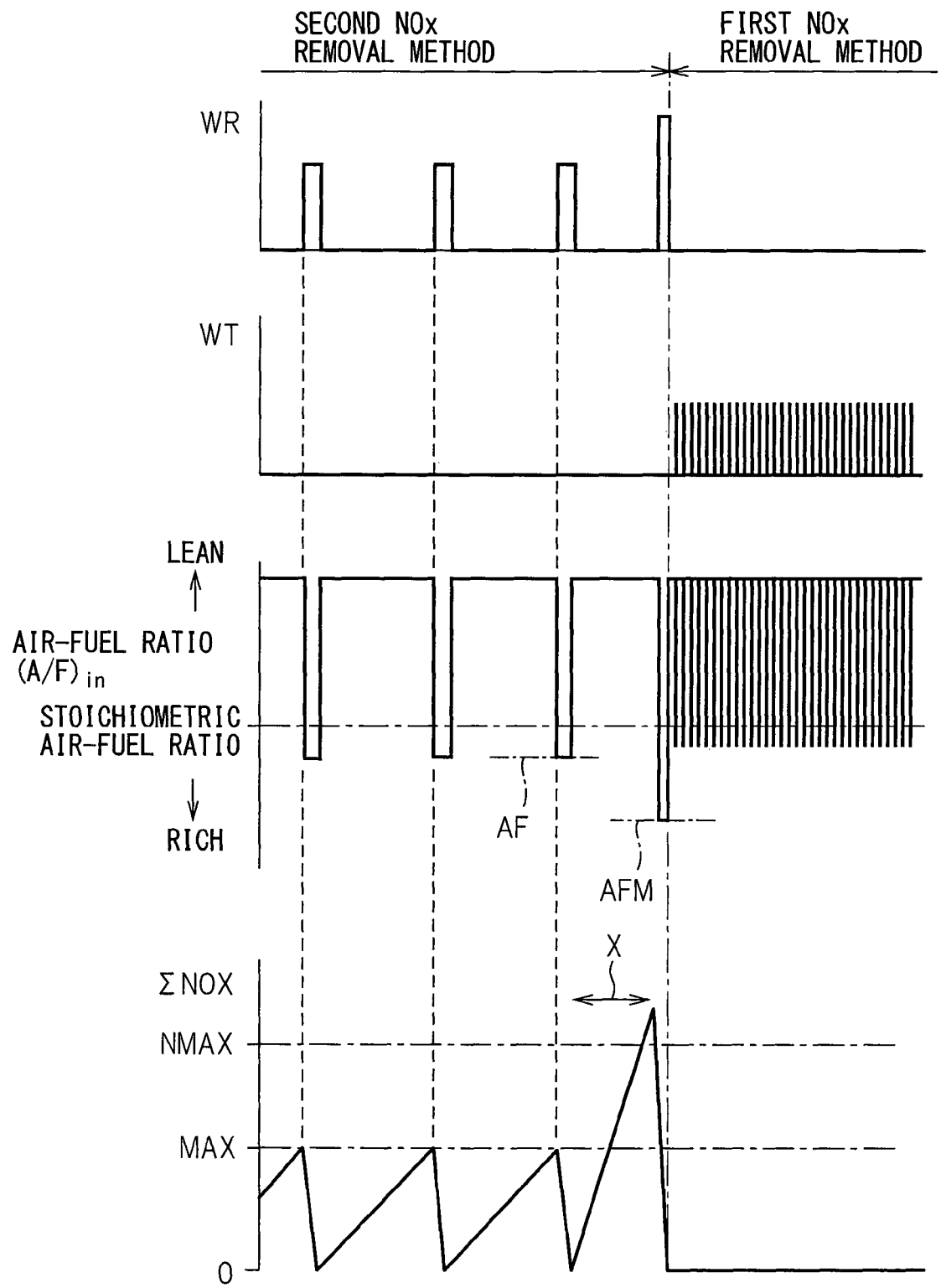
FIG. 19 is a view which shows a change in an air-fuel ratio of an inflowing exhaust gas into an exhaust purification catalyst, etc. when an $NO_x$ removal method is switched from a second $NO_x$ removal method to a first $NO_x$ removal method.

FIG. 17 to FIG. 19 show the change in the amount WR of injection to the combustion chamber 2 for generating rich combustion gas, the timing of injection of hydrocarbons WT, the change in the air-fuel ratio (A/F) in of the exhaust gas flowing into the exhaust purification catalyst 13, and the amount ΣNOX of $NO_x$ which is stored in the exhaust purification catalyst 13 when the $NO_x$ removal method is switched from the second $NO_x$ removal method to the first $NO_x$ removal method. As shown in FIG. 17 to FIG. 19, except when the $NO_x$ removal method is switched from the second $NO_x$ removal method to the first $NO_x$ removal method, when the second $NO_x$ removal method is being used, if the amount ΣNOX of $NO_x$ which is stored in the basic layer 53 of the exhaust purification catalyst 13 exceeds the allowable amount MAX, injection WR for generating rich combustion gas is performed in the combustion chamber 2 whereby the air-fuel ratio (A/F) in of the exhaust gas flowing into the exhaust purification catalyst 13 is made the first target rich air-fuel ratio AF. In this case, as explained above, the amount WR of fuel for the injection for generating rich combustion gas is stored in the form of a map such as shown in FIG. 15 in advance in the ROM 32. Therefore, the ROM 32 ends up storing the amount WR of fuel which is required for making the air-fuel ratio (A/F) in of the exhaust gas flowing into the exhaust purification catalyst 13 the first target rich air-fuel ratio AF.

On the other hand, in the present invention, as shown in FIG. 17, when the $NO_x$ removal method is switched from the second $NO_x$ removal method to the first NOX removal method, injection for generating rich combustion gas is performed to release the stored $NO_x$ from the exhaust purification catalyst 13. At this time, the amount WR of fuel for injection for generating rich combustion gas is made an amount of fuel whereby the air-fuel ratio (A/F) in of the exhaust gas flowing into the exhaust purification catalyst 13 becomes the second target rich air-fuel ratio AFM which is smaller than the first target rich air-fuel ratio AF. That is, at this time, the amount WR of fuel which is injected from the fuel injector 3 is increased. If the amount WR of fuel which is injected from the fuel injector 3 is increased, the time which is required for releasing the stored $NO_x$ from the exhaust purification catalyst 13 becomes shorter and, therefore, the time during which injection WR for generating rich combustion gas is performed becomes shorter. As a result, time sufficient for releasing the stored $NO_x$ from the exhaust purification catalyst 13 can be obtained and, therefore, when the $NO_x$ removal method is switched from the second $NO_x$ removal method to the first $NO_x$ removal method, it is possible to release the stored $NO_x$ well from the exhaust purification catalyst 13.

Note that, in the case where the second $NO_x$ removal method is being used, the first target rich air-fuel ratio AF for releasing the stored $NO_x$ from the exhaust purification catalyst 13 changes in accordance with the engine operating state. On the other hand, the second target rich air-fuel ratio AFM is set to a value which is, smaller than any first target rich air-fuel ratio AF which changes in accordance with the engine operating state. That is, the second target rich air-fuel ratio AFM is made a value which is smaller than the smallest target rich air-fuel ratio in the first target rich air-fuel ratios AF.

Next, referring to FIG. 18 and FIG. 19, another embodiment according to the present invention will be explained. As shown in FIG. 18 and FIG. 19, in this embodiment as well, except when the $NO_x$ removal method is switched from the second $NO_x$ removal method to the first $NO_x$ removal method, when the second $NO_x$ removal method is being used, the amount ΣNOX of $NO_x$ which is stored in the basic layer 53 of the exhaust purification catalyst 13 exceeds the allowable amount MAX, injection WR for generating rich combustion gas is performed in the combustion chamber 2 whereby the air-fuel ratio (A/F) in of the exhaust gas flowing into the exhaust purification catalyst 13 is made the first target rich air-fuel ratio AF. However, in this embodiment, as shown in FIG. 18, when the $NO_x$ removal method is switched from the second $NO_x$ removal method to the first $NO_x$ removal method, when the amount ΣNOX of $NO_x$ which is stored in the basic layer 53 of the exhaust purification catalyst 13 is smaller than a predetermined allowable amount NMAX, the air-fuel ratio (A/F) in of the exhaust gas flowing into the exhaust purification catalyst 13 is made the first target rich air-fuel ratio AF.

As opposed to this, as shown in FIG. 19, when the $NO_x$ removal method is switched from the second $NO_x$ removal method to the first $NO_x$ removal method, if the amount ΣNOX of $NO_x$ which is stored in the basic layer 53 of the exhaust purification catalyst 13 is greater than the predetermined allowable amount NMAX which is larger than the allowable amount MAX, the target rich air-fuel ratio is made the second target rich air-fuel ratio AFM. That is, in this embodiment, when the $NO_x$ removal method is switched from the second $NO_x$ removal method to the first $NO_x$ removal method, if the amount of $NO_x$ which is stored in the exhaust purification catalyst 13 is greater than the predetermined $NO_x$ amount MAX, the air-fuel ratio of the exhaust gas which flowing into the exhaust purification catalyst 13 is made the second target rich air-fuel ratio AFM. Note that, in this way, the stored $NO_x$ amount $\Sigma NOX$ exceeds the allowable amount MAX and becomes great since the engine operating state is an operating state other than the region which is shown by hatching in FIG. 16, that is, an operating state where it is impossible to generate a rich air-fuel ratio combustion gas in the combustion chamber 2. FIG. 9 shows the case where, as a typical example, the time period which is shown by the arrow X is a time period in which it is impossible to generate a rich air-fuel ratio combustion gas in the combustion chamber 2. In this embodiment, when the $NO_x$ removal method is switched from the second $NO_x$ removal method to the first $NO_x$ removal method, only if the amount of $NO_x$ which is stored in the exhaust purification catalyst is large, the target rich air-fuel ratio is made the large second target rich air-fuel ratio AFM. Therefore, in this embodiment, it is possible to reduce the amount of fuel consumption compared with the embodiment which is shown in FIG. 17.

Next, referring to FIG. 20, still another embodiment according to the present invention will be explained. In this embodiment as well, as shown in FIG. 17, except when the $NO_x$ removal method is switched from the second $NO_x$ removal method to the first $NO_x$ removal method, when the second $NO_x$ removal method is being used, if the amount $\Sigma NOX$ of $NO_x$ which is stored in the basic layer 53 of the exhaust purification catalyst 13 exceeds the allowable amount MAX, the air-fuel ratio (A/F) in of the exhaust gas flowing into the exhaust purification catalyst 13 is made the first target rich air-fuel ratio AF, while when the $NO_x$ removal method is switched from the second $NO_x$ removal method to the first $NO_x$ removal method, the air-fuel ratio (A/F) in of the exhaust gas flowing into the exhaust purification catalyst 13 is made the second target rich air-fuel ratio AFM.

Figure 20:
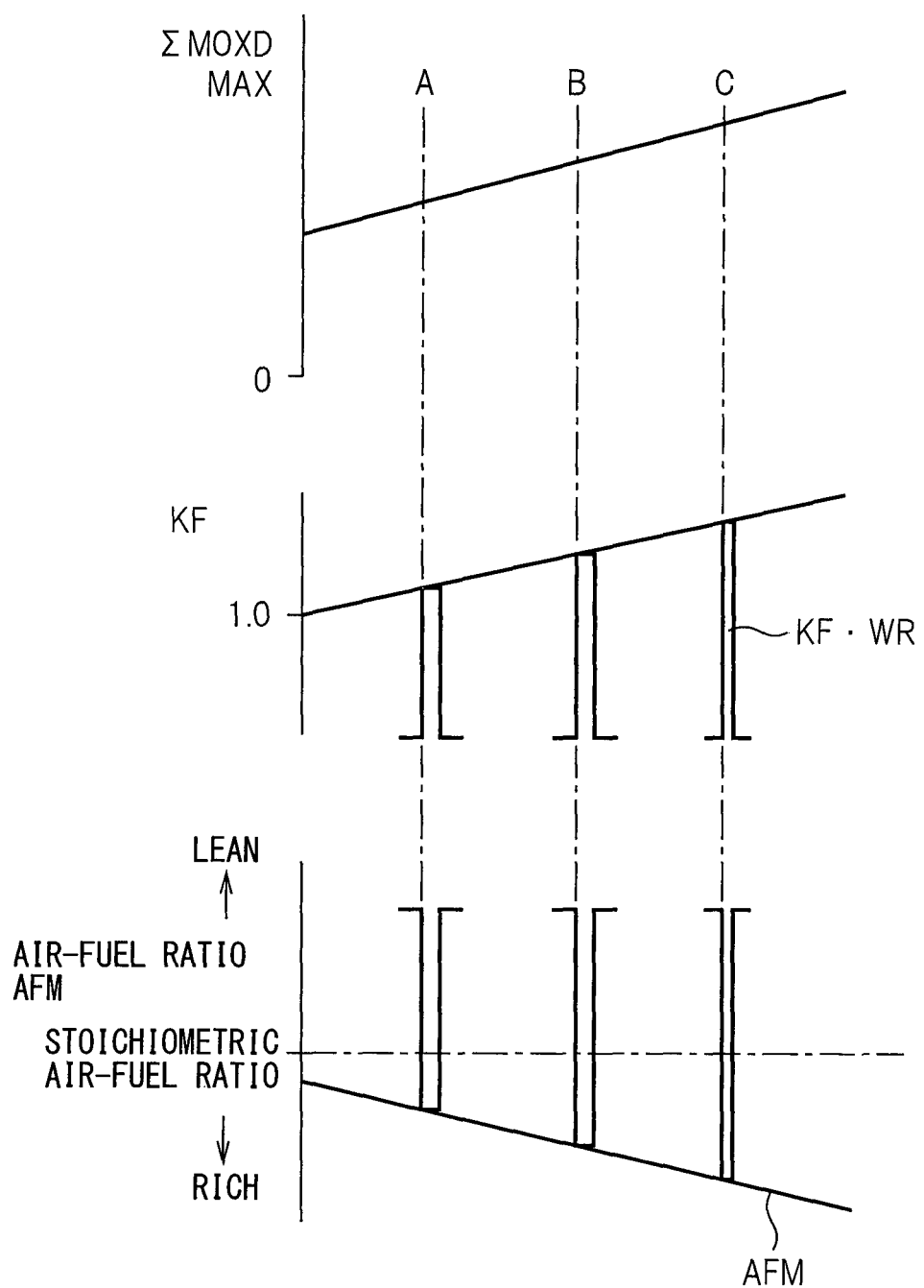
FIG. 20 is a view which explains a change in a second target rich air-fuel ratio.

At this time, that is, when the $NO_x$ removal method is switched from the second $NO_x$ removal method to the first $NO_x$ removal method, in this embodiment, as shown in FIG. 20, the larger the amount $\Sigma NOXD$ of $NO_x$ which is stored at the exhaust purification catalyst 13, the smaller the second target rich air-fuel ratio AFM. That is, FIG. 20 shows the changes in the air-fuel ratios of the exhaust gas flowing into the exhaust purification catalyst 13 for three typical examples A, B, and C. In this case, FIG. 20 shows the case where the amount $\Sigma NOXD$ of $NO_x$ which is stored in the exhaust purification catalyst 13 when the $NO_x$ removal method is switched from the second $NO_x$ removal method to the first $NO_x$ removal method becomes larger in the order of A, B, and C. Further, in this embodiment, the amount WR of fuel for injection for generating rich combustion gas is multiplied with the correction coefficient KF to thereby find the final amount WR of fuel, of the injection for generating rich combustion gas. FIG. 20 shows the change in this correction coefficient KF and the change in the amount of fuel KF·WR for injection for generating rich combustion gas for three typical examples A, B, and C.

When the $NO_x$ removal method is switched from the second $NO_x$ removal method to the first $NO_x$ removal method, the greater the amount $\Sigma NOXD$ of $NO_x$ which is stored in the exhaust purification catalyst 13, the more the amount of fuel which is required for releasing the stored $NO_x$ from the exhaust purification catalyst 13 increases. At this time, in order to inject the amount of fuel which is required for releasing $NO_x$ within a short time, it is necessary to increase the amount WR of fuel for the injection for generating rich combustion gas, that is, to lower the second target rich air-fuel ratio AFM. Therefore, in this embodiment, when the $NO_x$ removal method is switched from the second NOX removal method to the first NOX removal method, the larger the amount $\Sigma NOXD$ of $NO_x$ which is stored at the exhaust purification catalyst 13, the smaller the second target rich air-fuel ratio AFM.

Figure 21:
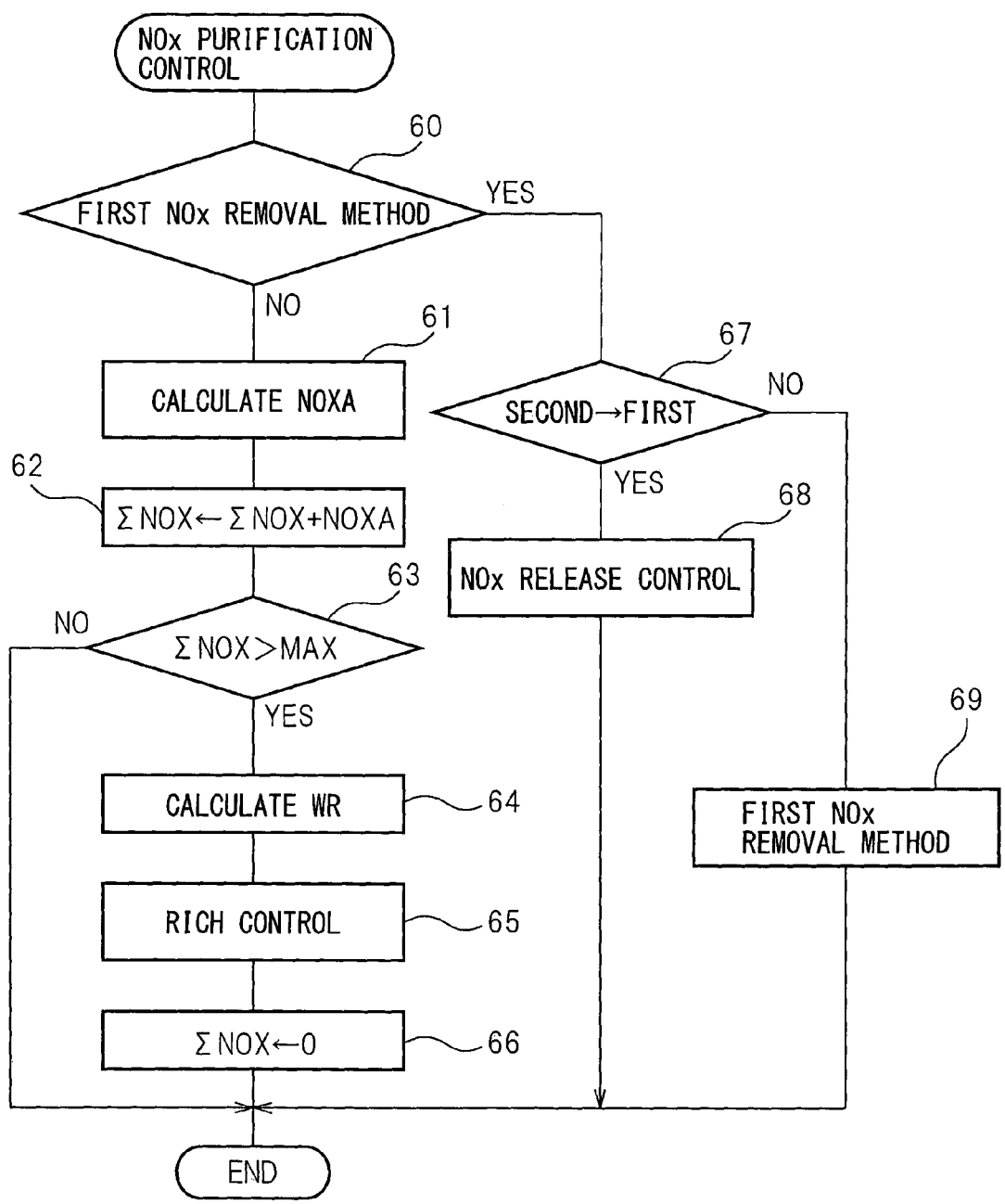
FIG. 21 is a flow chart for performing an $NO_x$ purification control.

FIG. 21 shows an $NO_x$ purification control routine. This routine is executed by interruption every fixed time interval.

Referring to FIG. 21, first, at step 60, it is judged from the catalyst temperature of the exhaust purification catalyst 13 etc. whether to use the first $NO_x$ removal method. When it is judged that the first $NO_x$ removal method cannot be used, that is, the second $NO_x$ removal method should be used, the routine proceeds to step 61 where the amount NOXA of $NO_x$ exhausted per unit time is calculated from the map which is shown in FIG. 13. Next, at step 62, the amount NOXA of $NO_x$ exhausted per unit time is added to $\Sigma NOX$ to thereby calculate the stored $NO_x$ amount $\Sigma NOX$. Next at step 63, it is judged if the stored $NO_x$ amount $\Sigma NOX$ exceeds the allowable value MAX. When $\Sigma NOX>MAX$, if an operating state which can generate combustion gas of a rich air-fuel ratio in the combustion chamber 2, the routine proceeds to step 64 where the amount WR of fuel for injection for generating rich combustion gas is calculated from the map which is shown in FIG. 15. Next, at step 65, rich control which performs injection for generating rich combustion gas is performed based on this fuel amount WR. At this time, the air-fuel ratio of the exhaust gas which flows into the exhaust purification catalyst 13 is made the first target rich air-fuel ratio AF. Next, at step 66, $\Sigma NOX$ is cleared.

On the other hand, when it is judged at step 60 that the first $NO_x$ removal method should be used, the routine proceeds to step 67 where it is judged if the $NO_x$ removal method is now switched from the second $NO_x$ removal method to the first $NO_x$ removal method. When it is judged at step 67 that the $NO_x$ removal method is now switched from the second $NO_x$ removal method to the first $NO_x$ removal method, the routine proceeds to step 68 where $NO_x$ release control according to the present invention is performed. Various embodiments of this $NO_x$ release control according to the present invention are shown from FIG. 22 to FIG. 24. On the other hand, when it is judged at step 67 that the $NO_x$ removal method is not now switched from the second $NO_x$ removal method to the first $NO_x$ removal method, the routine proceeds to step 69 where the $NO_x$ removal action by the first $NO_x$ removal method is performed. At this time, the hydrocarbon feed valve 15 injects the amount WT of hydrocarbons which was calculated from the map which is shown in FIG. 11A by the period $\Delta T$ which was calculated from the map which is shown in FIG. 11B.

Figure 22:
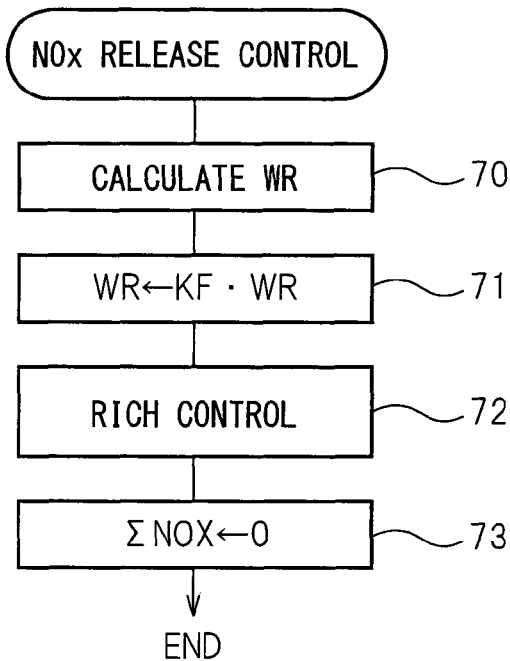
FIG. 22 is a flow chart for performing an $NO_x$ release control.

FIG. 22 shows the $NO_x$ release control routine which is performed at step 68 of FIG. 21 when the $NO_x$ removal method is switched from the second $NO_x$ removal method to the first $NO_x$ removal method and shows the routine for working the embodiment which is shown in FIG. 17.

Referring to FIG. 22, first, at step 70, the amount WR of fuel of the injection for generating rich combustion gas is calculated from the map which is shown in FIG. 15. Next, at step 71, this fuel amount WR is multiplied with a predetermined correction coefficient KF to thereby calculate the final fuel amount WR (=KF·WR). This correction coefficient KR is a constant value which is larger than 1.0. Next, at step 72, rich control which performs injection for generating rich combustion gas is performed based on this final fuel amount WR. At this time, the air-fuel ratio of the exhaust gas which flows into the exhaust purification catalyst 13 is made the second target rich air-fuel ratio AFM. Next, at step 73, ΣNOX is cleared.

Figure 23:
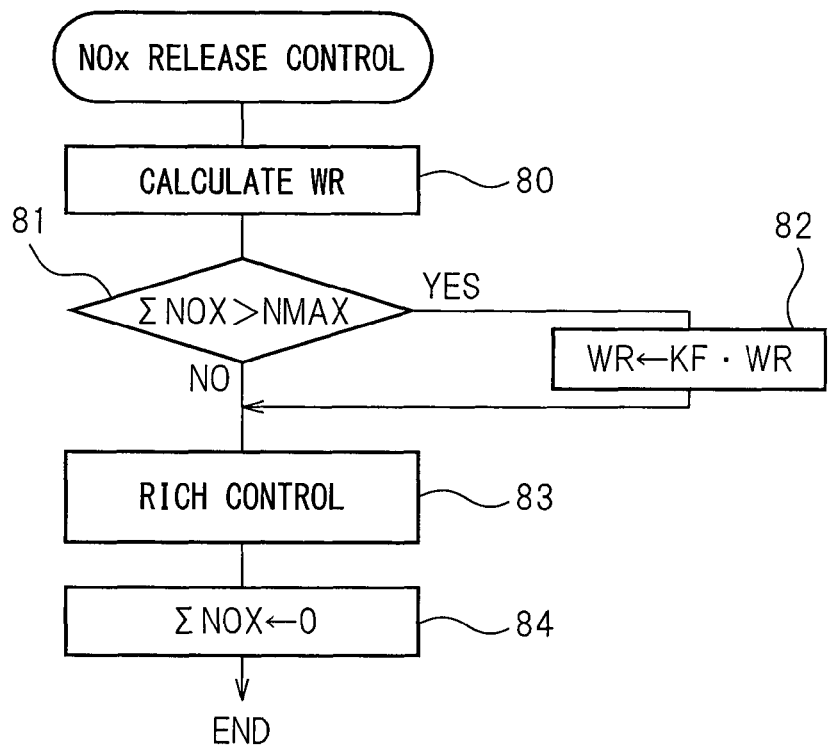
FIG. 23 is a flow chart of a further embodiment for performing an $NO_x$ release control.

FIG. 23 shows the $NO_x$ release control routine which is performed at step 68 of FIG. 21 when the $NO_x$ removal method is switched from the second $NO_x$ removal method to the first $NO_x$ removal method and shows the routine for working the embodiment which is shown in FIG. 18 and FIG. 19.

Referring to FIG. 23, first, at step 80, the amount WR of fuel of the injection for generating rich combustion gas is calculated from the map which is shown in FIG. 15. Next, at step 81, it is judged if the amount ΣNOX of $NO_x$ which is stored in the basic layer 53 of the exhaust purification catalyst 13 exceeds the allowable amount NMAX. When the stored $NO_x$ amount ΣNOX does not exceed the allowable amount NMAX, the routine proceeds to step 83. At step 83, rich control which performs injection for generating rich combustion gas is performed based on the calculated fuel amount WR. At this time, the air-fuel ratio of the exhaust gas which flows into the exhaust purification catalyst 13 is made the first target rich air-fuel ratio AF. As opposed to this, when it is judged at step 81 that the stored $NO_x$ amount ΣNOX exceeds the allowable amount NMAX, the routine proceeds to step 82 where the amount WR of fuel which was calculated at step 80 is multiplied with a predetermined correction coefficient KF and thereby the final fuel amount WR (=KF·WR) is calculated. This correction coefficient KR is a constant value which is larger than 1.0. Next, the routine proceeds to step 83. At step 83, rich control which performs injection for generating rich combustion gas is performed based on the calculated final fuel amount WR. At this time, the air-fuel ratio of the exhaust gas which flows into the exhaust purification catalyst 13 is made the second target rich air-fuel ratio AFM. Next, at step 84, ΣNOX is cleared.

Figure 24:
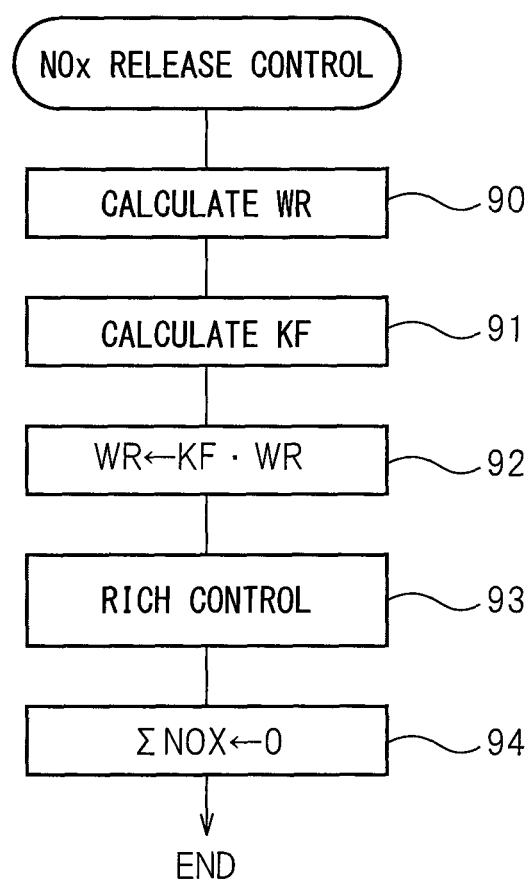
FIG. 24 is a flow chart of a still further embodiment for performing an $NO_x$ release control.

FIG. 24 shows an $NO_x$ release control routine which is performed at step 68 of FIG. 21 when the $NO_x$ removal method is switched from the second $NO_x$ removal method to the first $NO_x$ removal method and shows the routine for working the embodiment which is shown in FIG. 20.

Referring to FIG. 24, first, at step 90, the amount WR of fuel for injection for generating rich combustion gas is calculated from the map which is shown in FIG. 15. Next, at step 91, the correction coefficient KF for the amount WR of fuel for injection for generating rich combustion gas which is shown in FIG. 20 is calculated based on the amount ΣNOXD of $NO_x$ which is stored at the exhaust purification catalyst 13. Next, at step 92, this fuel amount WR is multiplied with this correction coefficient KF to calculate the final fuel amount WR (=KF·WR). Next, at step 93, rich control which performs injection for generating rich combustion gas is performed based on this final fuel amount WR. At this time, the air-fuel ratio of the exhaust gas which flows into the exhaust purification catalyst 13 is made the second target rich air-fuel ratio AFM. Next, at step 94, ΣNOX is cleared.

Note that, as another embodiment, it is also possible to arrange an oxidation catalyst for reforming hydrocarbons upstream of the exhaust purification catalyst 13 inside the engine exhaust passage.

REFERENCE SIGNS LIST 4 intake manifold
5 exhaust manifold
7 exhaust turbocharger
12 exhaust pipe
13 exhaust purification catalyst
14 particulate filter
15 hydrocarbon feed valve

The invention claimed is:

1. An method of purifying exhaust gas exhausted from an internal combustion engine which comprises an exhaust purification catalyst arranged in an engine exhaust passage and a hydrocarbon feed valve arranged in the engine exhaust passage upstream of the exhaust purification catalyst, a precious metal catalyst is carried on an exhaust gas flow surface of the exhaust purification catalyst, a basic layer is formed on the exhaust gas flow surface around the precious metal catalyst, and a first $NO_x$ removal method which reduces $NO_x$ contained in the exhaust gas by a reducing intermediate which is held on the basic layer and generated by injecting hydrocarbons from the hydrocarbon feed valve within a predetermined range of period and a second $NO_x$ removal method in which an air-fuel ratio of the exhaust gas flowing into the exhaust purification catalyst is made rich by a period which is longer than said predetermined range to make $NO_x$ which is stored in the exhaust purification catalyst when the air-fuel ratio of the exhaust gas is lean-to be released from the exhaust purification catalyst and be reduced are used, wherein if the catalyst temperature is low, the second $NO_x$ removal method is used, while if the catalyst temperature is high, the first $NO_x$ removal method is used, wherein
the air-fuel ratio of the exhaust gas flowing into the exhaust purification catalyst is made a first target rich air-fuel ratio by generating a rich air-fuel ratio combustion gas in a combustion chamber of the internal combustion engine when releasing a stored $NO_x$ from the exhaust purification catalyst when the second $NO_x$ removal method is being used, and the air-fuel ratio of the exhaust gas flowing into the exhaust purification catalyst is made a second target rich air-fuel ratio.

2. The exhaust purification system of an internal combustion engine claimed in claim 1 wherein the first target rich air-fuel ratio changes in accordance with an engine operating state, and the second target rich air-fuel ratio is smaller than the smallest target rich air-fuel ratio among the first target rich air-fuel ratios.

3. The exhaust purification system of an internal combustion engine claimed in claim 1, wherein the air-fuel ratio of the exhaust gas flowing into the exhaust purification catalyst is made the second target rich air-fuel ratio if an amount of $NO_x$ which is stored at the exhaust purification catalyst is larger than a predetermined amount of $NO_x$ when a $NO_x$ removal method is switched from the second $NO_x$ removal method to the first $NO_x$ removal method.

4. The exhaust purification system of an internal combustion engine as claimed in claim 1, wherein when a $NO_x$ removal method is switched from the second $NO_x$ removal method to the first $NO_x$ removal method, the larger the amount of $NO_x$ which is stored in the exhaust purification catalyst, the smaller the second target rich air-fuel ratio is made.

* * * * *